(12) United States Patent
Shibata

(10) Patent No.: US 11,820,133 B2
(45) Date of Patent: Nov. 21, 2023

(54) IMAGE PROCESSING METHOD, APPARATUS, PROGRAM, AND IMAGE FORMING APPARATUS

(71) Applicant: FUJIFILM Corporation, Tokyo (JP)

(72) Inventor: Hiroyuki Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 364 days.

(21) Appl. No.: 17/372,633

(22) Filed: Jul. 12, 2021

(65) Prior Publication Data

US 2021/0339522 A1 Nov. 4, 2021

Related U.S. Application Data

(63) Continuation of application No. PCT/JP2020/008730, filed on Mar. 2, 2020.

(30) Foreign Application Priority Data

Mar. 6, 2019 (JP) .................. 2019-040663

(51) Int. Cl.
*B41J 2/045* (2006.01)
*G06F 3/12* (2006.01)

(52) U.S. Cl.
CPC ......... *B41J 2/0451* (2013.01); *B41J 2/04508* (2013.01); *B41J 2/04581* (2013.01);
(Continued)

(58) Field of Classification Search
CPC ........ B41J 2/01; B41J 2/04508; B41J 2/0451; B41J 2/04581; B41J 2/2139; B41J 2/2146;
(Continued)

(56) References Cited

U.S. PATENT DOCUMENTS 8,967,750 B2 * 3/2015 Ueshima .............. B41J 2/12
347/14
9,967,428 B2 * 5/2018 Katsuyama .......... G06K 15/102
(Continued)

FOREIGN PATENT DOCUMENTS

JP 2004-202795 A 7/2004
JP 2006-297919 A 11/2006
(Continued)

OTHER PUBLICATIONS

International Search Report dated May 19, 2020 in International Application No. PCT/JP2020/008730.
(Continued)

*Primary Examiner* — Anh T Vo
(74) *Attorney, Agent, or Firm* — Sughrue Mion, PLLC

(57) ABSTRACT

An image processing method, an apparatus, a program, and an image forming apparatus capable of suppressing an artifact in a boundary part of a threshold value matrix and performing high-quality correction even in a case where defective recording elements are concentrated are provided. An image processing method according to an aspect of the present invention includes performing correction of suppressing visibility of an image defect using recording elements around a defective recording element of a recording head by disabling the defective recording element, and performing quantization of data of an image, in which processing of the quantization includes applying a first threshold value matrix to a first image region that is separated by more than a first distance from a defective image region, applying a second threshold value matrix to a second image region separated by less than the first distance, and applying a third threshold value matrix to a third image region at a boundary between the first image region and the second image region.

17 Claims, 23 Drawing Sheets

(52) U.S. Cl.
CPC ............ *G06F 3/121* (2013.01); *G06F 3/1211* (2013.01); *G06F 3/1234* (2013.01)

(58) Field of Classification Search
CPC .... H04N 1/4015; H04N 1/405; G06F 3/1208; G06F 3/121; G06F 3/1211; G06F 3/1234; G06F 3/1247
See application file for complete search history.

(56) References Cited

U.S. PATENT DOCUMENTS

| | | |
|---|---|---|
| 2006/0214971 A1 | 9/2006 | Yamazaki |
| 2011/0234673 A1* | 9/2011 | Ueshima ................ B41J 2/2139 347/14 |
| 2014/0300656 A1 | 10/2014 | Ueshima |
| 2015/0043836 A1 | 2/2015 | Shibata |
| 2015/0286908 A1 | 10/2015 | Shibata |
| 2015/0290930 A1 | 10/2015 | Shibata |
| 2017/0282535 A1 | 10/2017 | Shibata |
| 2019/0381804 A1 | 12/2019 | Shibata |

FOREIGN PATENT DOCUMENTS

| | | |
|---|---|---|
| JP | 4670696 B2 | 4/2011 |
| JP | 2014-144549 A | 8/2014 |
| JP | 2014-144610 A | 8/2014 |
| JP | 2014-200970 A | 10/2014 |
| JP | 5791155 B2 | 10/2015 |
| JP | 5916642 B2 | 5/2016 |
| JP | 2017-177441 A | 10/2017 |
| WO | 2018/181166 A1 | 10/2018 |

OTHER PUBLICATIONS

Written Opinion of the International Searching Authority dated May 19, 2020 in International Application No. PCT/JP2020/008730.
International Preliminary Report on Patentability dated Aug. 25, 2021 in International Application No. PCT/JP2020/008730.
Office Action dated Aug. 31, 2022 from the Japanese Patent Office in JP Application No. 2021-504088.

* cited by examiner

PAPER TRANSPORT DIRECTION

IMAGE PROCESSING METHOD, APPARATUS, PROGRAM, AND IMAGE FORMING APPARATUS

CROSS-REFERENCE TO RELATED APPLICATIONS

The present application is a Continuation of PCT International Application No. PCT/JP2020/008730 filed on Mar. 2, 2020 claiming priority under 35 U.S.C § 119(a) to Japanese Patent Application No. 2019-040663 filed on Mar. 6, 2019. Each of the above applications is hereby expressly incorporated by reference, in its entirety, into the present application.

BACKGROUND OF THE INVENTION

1. Field of the Invention

The present invention relates to an image processing method, an apparatus, a program, and an image forming apparatus and particularly, to a halftone processing technology for performing gradation representation by recording dots in digital printing of an ink jet printing apparatus or the like, and a correction technology for decreasing visibility of an image defect caused by a defect of a recording element.

2. Description of the Related Art

In an ink jet printing apparatus of a single pass method that is a form of an image forming apparatus, a problem arises in that a streak occurs in a paper forwarding direction due to a defect of a nozzle. In order to resolve such a problem, image correction that reduces visibility of the streak by causing the defective nozzle not to jet and then, complementing a missing density due to non-jetting with surrounding nozzles is performed. The non-jetting refers to disabling of the defective nozzle not to be used and is also called "masking". The masked defective nozzle becomes a non-jetting nozzle. In addition, "reducing visibility" refers to reduction of visibility of a defective part such as the streak and is also called "non-visualization". This image correction technology is called "defective nozzle correction", "non-jetting correction", "streak correction", or the like. Technologies disclosed in JP2004-202795A and JP4670696B use a threshold value matrix for processing quantization in the image correction technology. The "threshold value matrix" is synonymous with a "dithering matrix".

The technology disclosed in JP2004-202795A is a technology for quantization using different threshold value matrices for pixels of each region of a correction portion and a normal portion in an image. That is, in an image processing apparatus disclosed in JP2004-202795A, a normal threshold value matrix and a threshold value matrix for handling the non-jetting are included, and the threshold value matrices are selectively applied based on non-jetting position information that indicates a pixel position corresponding to a non-jetting nozzle position.

In this technology, a plurality of threshold value matrices for handling the non-jetting that correspond in number to combinations of non-jetting nozzles are prepared. In a case where a non-jetting nozzle occurs, the quantization is performed using a corresponding threshold value matrix. A two-dimensional threshold value matrix of a size M=N×N is considered as an example. In a case where it is assumed that the number of non-jetting nozzles that occur at the same time in an image region of the size N is only one, the number of occurrence patterns of the non-jetting is N. Thus, the number of threshold value matrices to be prepared for switching is N, and a total size is M×N (=N×N×N, that is, N to the third power). Similarly, in a case where two or more occurrences of the non-jetting at the same time are assumed, the total size of N to the fourth power is necessary.

In a case where the size of the threshold value matrix is decreased, a stored capacity is reduced. However, in this case, a blue noise mask cannot be used. Thus, a problem arises in that high image quality cannot be obtained. That is, in the technology disclosed in JP2004-202795A, in a case where it is considered that a plurality of non-jetting nozzles occur, blow-up of solutions occurs, and a problem arises in that the stored capacity is increased.

In order to deal with this problem, a "basic threshold value matrix" applied to a normal region other than a region in which the non-jetting occurs, and a "sub-matrix" partially applied to the region in which the non-jetting occurs are used in JP4670696B. That is, in JP4670696B, the sub-matrix is used for defective nozzle correction in quantization that uses the threshold value matrix.

SUMMARY OF THE INVENTION

Generally, in a case of switching the sub-matrix to be used depending on regions of the image, a problem arises in that an artifact occurs in a boundary portion. In the technology disclosed in JP4670696B, a pattern is decided in advance such that the artifact does not occur at a boundary. In such a manner, by preparing the sub-matrix of a relatively small size in advance considering the artifact at the boundary, the problem of blow-up of solutions and the problem of the artifact in the boundary portion are resolved.

However, in this method, the non-jetting cannot be corrected with high quality in a case where the non-jetting occurs in a concentrated manner. This is because while each sub-matrix is considered such that the artifact does not occur between the sub-matrix and the basic threshold value matrix, a mutual action between the sub-matrices is not considered. Thus, the artifact occurs in a case where a plurality of sub-matrices are arranged in a narrow region due to concentration of non-jetting. Thus, granularity of the corresponding region deteriorates, and a problem arises in that the streak is not appropriately corrected.

In addition, in a case where an interval between the non-jetting and the non-jetting is narrow, the sub-matrices overlap with or become adjacent to each other. Regarding this problem, a method of decreasing the size of the sub-matrix is presented in JP4670696B. However, in a case of two occurrences of the non-jetting at positions separated by approximately one or two nozzles, a case where the sub-matrices overlap with or become adjacent to each other occurs.

In the technology of JP4670696B, since the artifact in the boundary portion between the plurality of sub-matrices cannot be considered for the sub-matrices, a problem arises in that correction cannot be clearly performed.

That is, in order to appropriately correct the streak without the artifact even in a case where the non-jetting occurs in a concentrated manner, it is desirable to suppress the artifact by considering mutual actions at a boundary between a non-jetting portion and surrounding matrices and a boundary between a plurality of non-jetting regions while dealing with the problem of blow-up of solutions.

Various problems above are not limited to the ink jet printing apparatus and are common problems in processing of the quantization using the threshold value matrix in a case of forming the image using a recording head including multiple recording elements that record dots of each pixel.

The present invention is conceived in view of such a matter and resolves at least one of a plurality of problems above, and an object thereof is to provide an image processing method, an apparatus, a program, and an image forming apparatus capable of suppressing an artifact in a boundary part of a threshold value matrix in a case of performing quantization using the threshold value matrix, and performing high-quality correction without deterioration in granularity of a correction portion even in a case where defective recording elements occur in a concentrated manner.

An image processing method according to an aspect of the present disclosure comprises acquiring information indicating recording characteristics of recording elements in a recording head including a plurality of the recording elements, performing correction of suppressing visibility of an image defect caused by a defective recording element using the recording elements around the defective recording element by performing masking processing of disabling the defective recording element in accordance with the recording characteristics of the recording elements, and performing processing of quantization of data of an image by applying a threshold value matrix selected from a first threshold value matrix, a second threshold value matrix, and a third threshold value matrix in accordance with a position of the image, in which the processing of the quantization includes applying the first threshold value matrix to a first image region that is separated by more than a first distance from a defective image region of the image corresponding to the defective recording element, applying the second threshold value matrix to a second image region that is a region around the defective image region and is separated by less than the first distance from the defective image region, and applying the third threshold value matrix to a third image region that is positioned at a boundary between the first image region and the second image region.

According to this aspect, by applying the third threshold value matrix to a boundary portion between the first threshold value matrix and the second threshold value matrix, an artifact in the boundary portion can be suppressed.

The image processing method according to another aspect of the present disclosure can be configured to further comprise, in a case where a plurality of the defective recording elements are present, and a distance between the nearby defective recording elements is less than a second distance, performing the quantization of a pixel between the nearby defective recording elements using the second threshold value matrix.

According to this aspect, in a case where the defective recording elements are concentrated, high-quality correction can be performed without deterioration in granularity of a correction region including the second image region.

The image processing method according to still another aspect of the present disclosure may be configured such that the second threshold value matrix has frequency characteristics in which the quantization is performed such that a peak frequency component of the quantization is positioned in a frequency band excluding a frequency band near a spatial frequency peak of the second image region.

According to this aspect, the artifact can be suppressed in the correction portion near a defective position corresponding to the defective recording element.

The image processing method according to another aspect of the present disclosure can be configured such that the second threshold value matrix has frequency characteristics in which a spatial frequency component in a first direction parallel to a relative movement direction of a recording medium with respect to the recording head is suppressed for all spatial frequency components in a second direction orthogonal to the first direction.

According to this aspect, the artifact can be suppressed in the correction portion near the defective position corresponding to the defective recording element.

The image processing method according to still another aspect of the present disclosure can be configured such that the second threshold value matrix is generated by referring to a common pattern of at least one of a first pattern generated from the first threshold value matrix or a second pattern used in a case of generating the first threshold value matrix.

According to this aspect, the artifact can be suppressed in the correction portion near the defective position corresponding to the defective recording element.

The image processing method according to still another aspect of the present disclosure can be configured such that the third threshold value matrix is generated using a first threshold value matrix pattern that is dot arrangement implemented by the first threshold value matrix, and a second threshold value matrix pattern that is dot arrangement implemented by the second threshold value matrix, such that a low frequency component of a pattern in which the first threshold value matrix pattern and the second threshold value matrix pattern are combined is suppressed.

According to this aspect, a boundary between the first threshold value matrix and the second threshold value matrix can be smoothly connected by suppressing the artifact.

The image processing method according to still another aspect of the present disclosure can be configured such that a plurality of types of threshold value matrices are used as the third threshold value matrix, and the plurality of types of the third threshold value matrices are selectively applied in accordance with a position relationship between the first threshold value matrix and the second threshold value matrix.

For example, the plurality of types of third threshold value matrices may include a threshold value matrix for a left boundary portion applied to a boundary with the first threshold value matrix on a left side of the second threshold value matrix, and a threshold value matrix for a right boundary portion applied to a boundary with the first threshold value matrix on a right side of the second threshold value matrix.

The image processing method according to still another aspect of the present disclosure can be configured such that the plurality of types of third threshold value matrices are generated by optimizing patterns of a plurality of boundary parts at the same time in the plurality of boundary parts generated by combining a first threshold value matrix pattern that is dot arrangement implemented by the first threshold value matrix, and a second threshold value matrix pattern that is dot arrangement implemented by the second threshold value matrix.

The image processing method according to still another aspect of the present disclosure can be configured such that the third threshold value matrix is generated by sequentially changing a boundary position at which a first threshold value matrix pattern that is dot arrangement implemented by the first threshold value matrix, and a second threshold value matrix pattern that is dot arrangement implemented by the second threshold value matrix are combined, and is generated by combining patterns of the plurality of boundary positions.

The image processing method according to still another aspect of the present disclosure can be configured such that the processing of the quantization includes, in a case where the defective recording element is present in the recording head, offsetting a phase of a reference position in a case of referring to the threshold value matrix selected from the first threshold value matrix, the second threshold value matrix, and the third threshold value matrix, in accordance with an address of the image representing the position of the image.

A program according to another aspect of the present disclosure is a program causing a computer to execute the image processing method according to any one aspect of the present disclosure.

An image processing apparatus according to another aspect of the present disclosure is an image processing apparatus comprising a recording element information acquisition portion that acquires information indicating recording characteristics of recording elements in a recording head including a plurality of the recording elements, a correction processing portion that performs correction of suppressing visibility of an image defect caused by a defective recording element using the recording elements around the defective recording element by performing masking processing of disabling the defective recording element in accordance with the recording characteristics of the recording elements, and a quantization processing portion that performs processing of quantization of data of an image by referring to a threshold value matrix selected from a first threshold value matrix, a second threshold value matrix, and a third threshold value matrix in accordance with a position of the image, in which the quantization processing portion applies the first threshold value matrix to a first image region that is separated by more than a first distance from a defective image region of the image corresponding to the defective recording element, applies the second threshold value matrix to a second image region that is a region around the defective image region and is separated by less than the first distance from the defective image region, and applies the third threshold value matrix to a third image region that is positioned at a boundary between the first image region and the second image region.

The image processing apparatus according to still another aspect of the present disclosure can be configured to further comprise a threshold value matrix storage portion that stores the first threshold value matrix, the second threshold value matrix, and the third threshold value matrix, and a region selection processing portion that selects the first threshold value matrix, the second threshold value matrix, and the third threshold value matrix to be referred to in the processing of the quantization in accordance with defective recording element information including position information of the defective recording element and the position of the image.

The image processing apparatus according to still another aspect of the present disclosure can be configured to further comprise a density correction processing portion that performs density correction processing of correcting a pixel value of an image position corresponding to each recording element using a density correction table corresponding to the recording characteristics of each of the plurality of recording elements, in which the region selection processing portion switches the density correction table to be applied to the density correction processing in connection with selection of the threshold value matrix.

The image processing apparatus according to still another aspect of the present disclosure can be configured to further comprise a defective recording element detection processing portion that performs processing of detecting the defective recording element of the recording head, and a density correction table generation processing portion that performs processing of generating a density correction table corresponding to the recording characteristics of each of the plurality of recording elements.

The image processing apparatus according to still another aspect of the present disclosure can be configured such that the recording head is an ink jet head, and the recording elements are nozzles jetting ink.

An image forming apparatus according to another aspect of the present disclosure is an image forming apparatus comprising the image processing apparatus according to any one aspect of the present disclosure, and a recording head that records an image on a recording medium using image data quantized using the image processing apparatus.

According to the present invention, in a case of performing the quantization on the image data using the threshold value matrix, the artifact in the boundary part of the threshold value matrix can be suppressed, and a high-quality image can be obtained.

DESCRIPTION OF THE PREFERRED EMBODIMENTS

Hereinafter, an embodiment of the present invention will be described in detail in accordance with the appended drawings.

<<Summary>>

An image processing method according to the embodiment of the present invention is a method of generating a dot image indicating an arrangement pattern of dots by quantizing data of an input image using a dithering method, in order to form an image by an ink jet printing apparatus. In a case of performing quantization, the image processing method according to the present embodiment uses a threshold value matrix for a normal portion to be applied to a normal portion in the image, a threshold value matrix for a correction portion to be applied to a correction portion, and also a threshold value matrix for a boundary portion to be applied to a boundary portion of a region to which both of the threshold value matrices are applied.

The normal portion refers to a region of an image region in which a defective nozzle is not present nearby. The correction portion refers to a region of the image region in which the defective nozzle is present nearby. For example, a range of "nearby" can be decided as a range of a distance within p pixels from a position of a pixel corresponding to the defective nozzle as a reference. Here, p may be an appropriate integer satisfying $1 \leq p \leq 7$, preferably $1 \leq p \leq 5$, and more preferably $1 \leq p \leq 3$.

The threshold value matrix for the normal portion will be referred to as a "normal portion threshold value matrix". The threshold value matrix for the correction portion will be referred to as a "correction portion threshold value matrix". The threshold value matrix for the boundary portion will be referred to as a "boundary portion threshold value matrix".

The boundary portion threshold value matrix is generated such that the correction portion threshold value matrix and the normal portion threshold value matrix are smoothly connected without an artifact. Accordingly, the artifact does not occur in the boundary portion.

Figure 1:
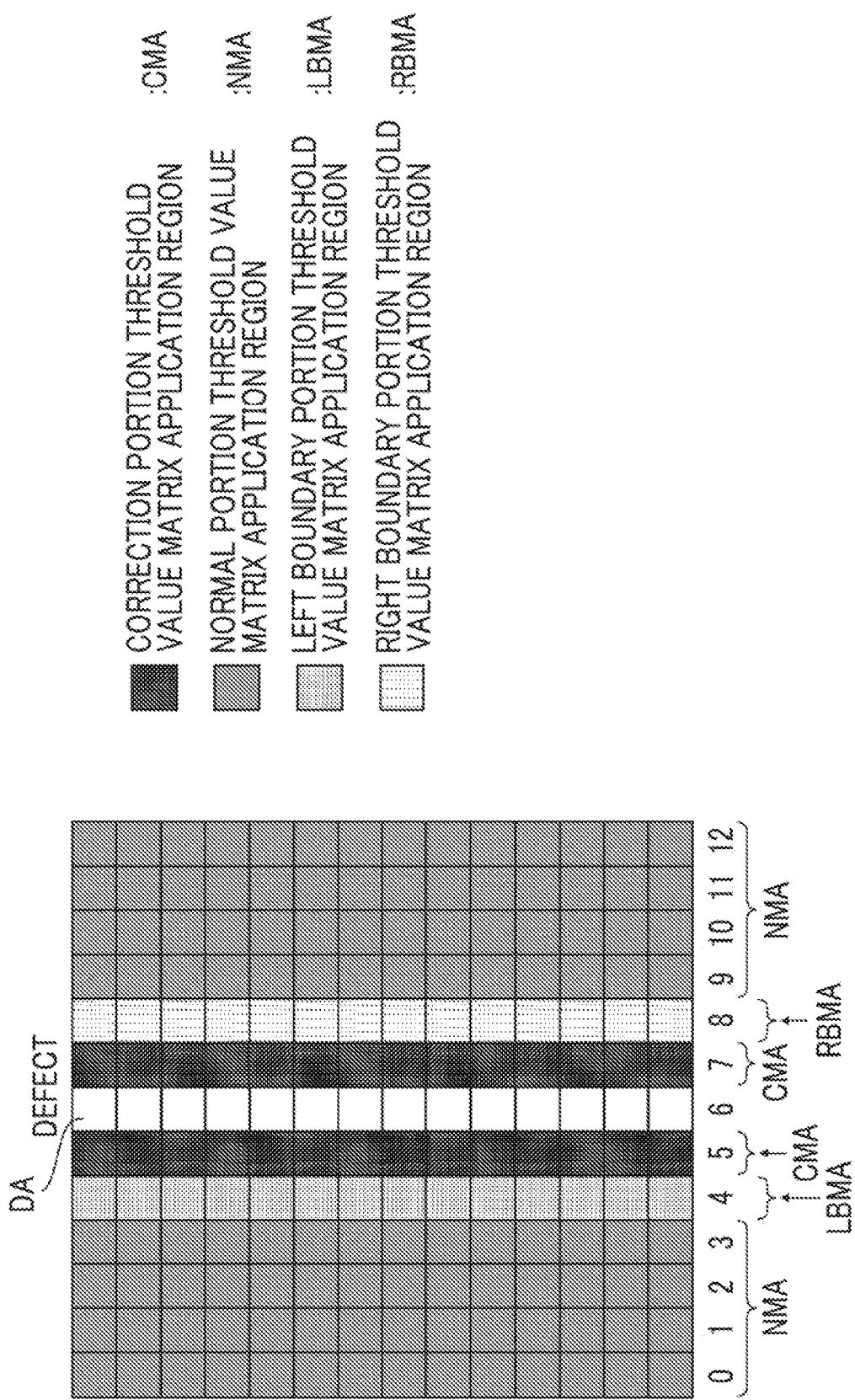
FIG. 1 is a schematic diagram of image data of a target of quantization.

FIG. 1 is a schematic diagram of image data of a target of quantization. Here, an image IM of which the number of pixels is 14 rows×13 columns is illustrated as an example of the image data. The image IM represents an image region of a part of input image data.

In FIG. 1, a horizontal direction will be referred to as an X direction, and a vertical direction will be referred to as a Y direction. The X direction is an arrangement direction of nozzles in a line-type ink jet head, not illustrated, and the Y direction is a transport direction of paper with respect to the line-type ink jet head.

Each pixel arranged in the X direction is associated with a nozzle that performs recording at a position of the pixel. That is, an X direction position of the pixel is associated with a nozzle number of the line-type ink jet head. The position of the pixel will be referred to as an "address of the image", and the X direction position of the pixel will be referred to as an X address. The address of the image is information indicating an image position. Here, in a case where x is an integer, it is assumed that the position of the pixel at which the X address is x corresponds to a nozzle number x, and that the position of the pixel at which the X address is x+1 corresponds to a nozzle number k+1. In the present specification, "adjacent nozzles" mean nozzles of which the nozzle numbers are adjacent, and "nearby nozzles" refer to nozzles of which the nozzle numbers are close.

In FIG. 1, in a case where a leftmost pixel column is called a pixel column of a zeroth column by setting the X address of the leftmost pixel column to "0", it is assumed that a nozzle that performs recording for a pixel column of a sixth column is the defective nozzle. Here, it is assumed that recording is complemented by causing the defective nozzle not to jet and using an adjacent nozzle of the non-jetting nozzle (defective nozzle). A nozzle for correction to be used for complementation will be referred to as a "correction nozzle". In the example in FIG. 1, two nozzles that are adjacent on both of left and right sides with the "defective nozzle" interposed therebetween are the "correction nozzles".

An image region corresponding to the correction nozzle may be decided as the "correction portion". That is, in FIG. 1, regions of pixel columns of a fifth column and a seventh column that are adjacent on both of left and right sides with the defective pixel column of the sixth column interposed therebetween are the correction portions. An image region of the pixel column of the defective nozzle will be referred to as a "defective portion" and will be denoted by a reference numeral "DA". The pixel column of the sixth column is the defective portion DA.

Meanwhile, image regions of the zeroth column to a third column and regions of a ninth column to a twelfth column each are the "normal portions". Regions of pixel columns of a fourth column and an eighth column are boundary portions between the correction portions and the normal portions. In FIG. 1, a boundary portion on a left side with respect to the defective pixel column will be referred to as a "left boundary portion", and a boundary portion on a right side will be referred to as a "right boundary portion".

In the present embodiment, four types of threshold value matrices respectively applied to the correction portion, the normal portion, the left boundary portion, and the right boundary portion are used. That is, in the present embodiment, a threshold value matrix set including four types of threshold value matrices of a correction portion threshold value matrix CM, a normal portion threshold value matrix NM, a left boundary portion threshold value matrix LBM, and a right boundary portion threshold value matrix RBM is used. The "left boundary portion threshold value matrix LBM" and the "right boundary portion threshold value matrix RBM" applied to the boundary portion will be collectively referred to as a "boundary portion threshold value matrix BM".

A threshold value matrix to be referred to is selected from the threshold value matrix set in accordance with a position of a pixel of a quantization processing target.

In a case of the example illustrated in FIG. 1, regions of the pixel columns of the fifth column and the seventh column are correction portion threshold value matrix application regions CMA. Meanwhile, regions of the zeroth column to the third column and regions of the ninth column to the twelfth column each are normal portion threshold value matrix application regions NMA.

The region of the pixel column of the fourth column is a left boundary portion threshold value matrix application region LBMA, and the image region of the pixel column of the eighth column is a right boundary portion threshold value matrix application region RBMA.

The defective portion DA in FIG. 1 is an example of a "defective image region" according to the present disclosure. The normal portion, that is, the normal portion threshold value matrix application region NMA, is an example of a "first image region" according to the present disclosure. The correction portion, that is, the correction portion threshold value matrix application region CMA, is an example of a "second image region" according to the present disclosure. The boundary portion, that is, the left boundary portion threshold value matrix application region LBMA and the right boundary portion threshold value matrix application region RBMA, is an example of a "third image region" according to the present disclosure. The normal portion threshold value matrix NM is an example of a "first threshold value matrix" according to the present disclosure. The correction portion threshold value matrix CM is an example of a "second threshold value matrix" according to the present disclosure. The left boundary portion threshold value matrix LBM and the right boundary portion threshold value matrix RBM are an example of a "third threshold value matrix" according to the present disclosure.

FIRST EXAMPLE

Figure 2:
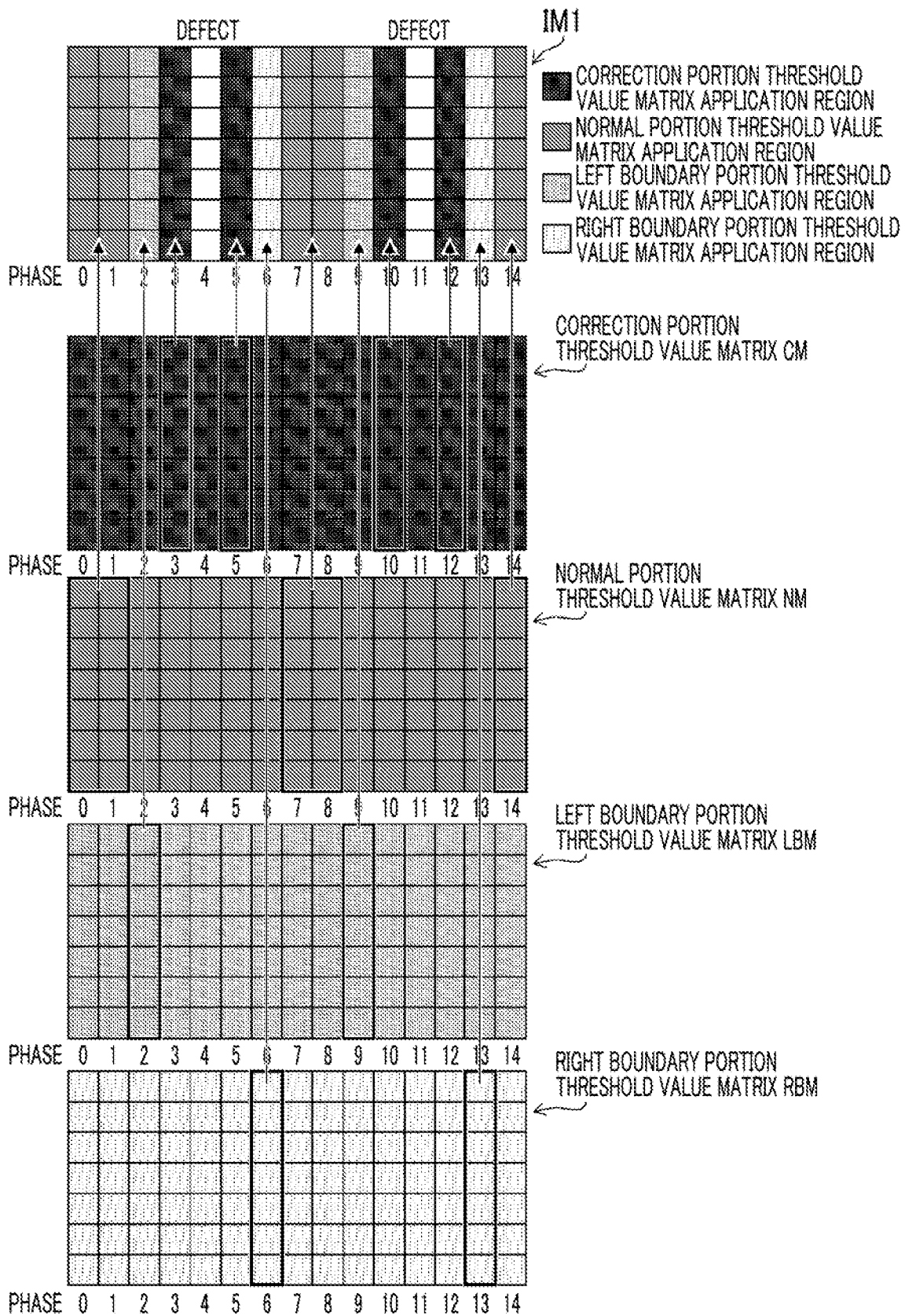
FIG. 2 is a conceptual diagram illustrating a summary of quantization processing according to a first example.

FIG. 2 is a conceptual diagram illustrating a summary of quantization processing according to a first example. As illustrated in FIG. 2, image values are quantized by selectively referring to each threshold value matrix in the threshold value matrix set in accordance with the address of the image.

In FIG. 2, an example of an image IM1 of which the number of pixels is 8 rows×15 columns is illustrated. In a case of FIG. 2, the fourth column and the eleventh column are the defective portions DA corresponding to the defective nozzles within a range of the leftmost zeroth column to a rightmost fourteenth column.

As illustrated in FIG. 2, a phase coordinate of the corresponding threshold value matrix is referred to in accordance with the address of the image. The first example illustrated in FIG. 2 is an example in which a phase of the address of the image matches a phase of the threshold value matrix to be referred to. That is, for example, a threshold value corresponding to each of a phase coordinate 0 and a phase coordinate 1 of the normal portion threshold value matrix NM is referred to in quantization of pixels belonging to the zeroth column (phase 0) and the first column (phase 1) of the image IM1. Similarly, a threshold value corresponding to a phase coordinate 2 of the left boundary portion threshold value matrix LBM is referred to in quantization of pixels of the second column (phase 2), and a threshold value corresponding to a phase coordinate 3 of the correction portion threshold value matrix CM is referred to in quantization of pixels of the third column (phase 3). Masking is performed on the pixels belonging to the defective portions DA. Thus, in processing of the quantization, for example, quantization may be uniformly performed using a value such as "0".

In a case of the first example illustrated in FIG. 2, the correction portion threshold value matrix CM is discontinuously used in the defective portions DA. Thus, while there is no problem in a boundary portion BA, there is a possibility that an artifact cannot be appropriately suppressed in a correction portion CA. This problem can be avoided using a second example described below or a technology (described later) of JP5916642B for the threshold value matrix for the correction portion.

SECOND EXAMPLE

Figure 3:
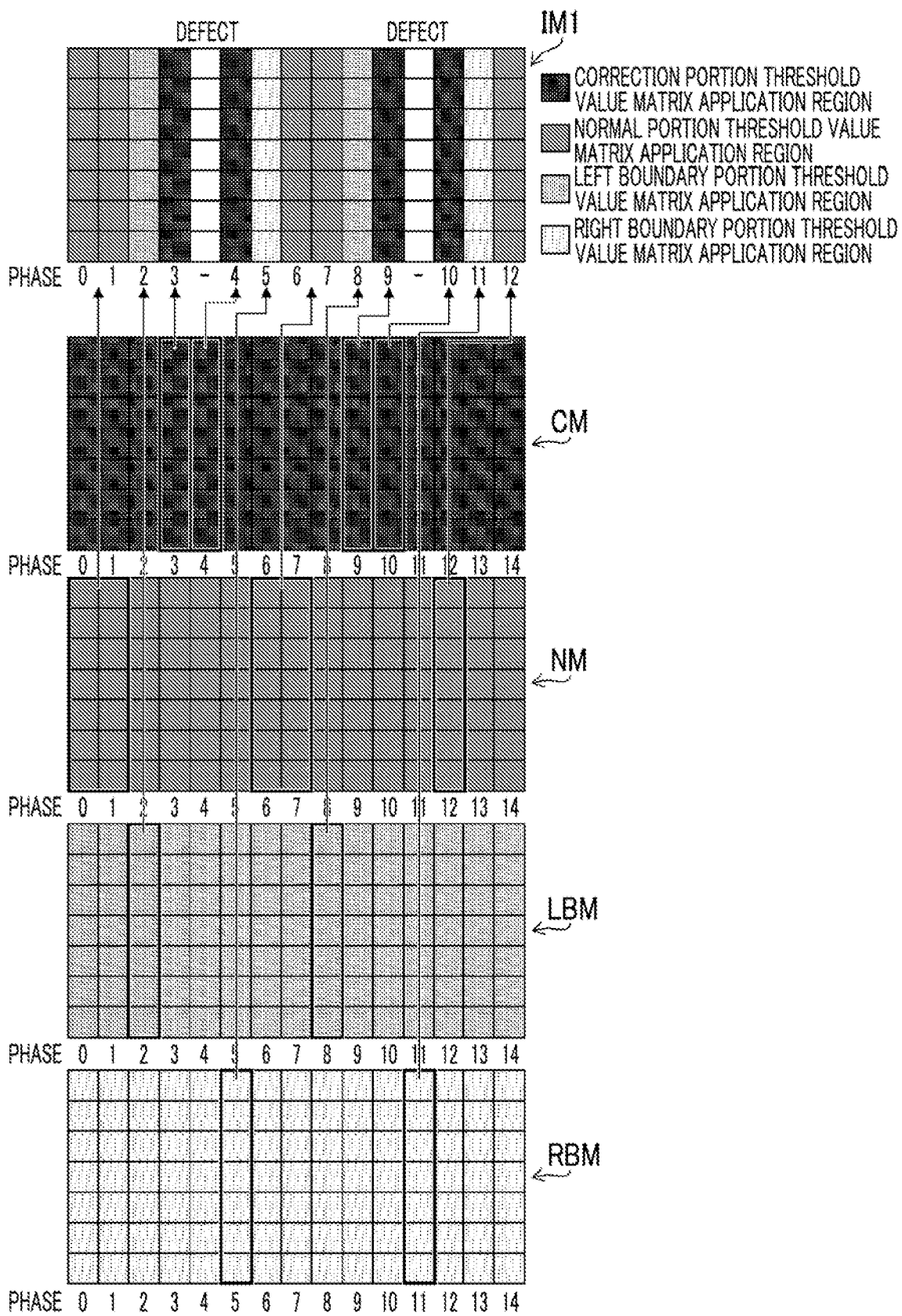
FIG. 3 is a conceptual diagram illustrating a summary of quantization processing according to a second example.

FIG. 3 is a conceptual diagram illustrating a summary of quantization processing according to the second example. In the second example illustrated in FIG. 3, the phase coordinate of the threshold value matrix corresponding to the address of the image is referred to in the same manner as the first example. However, in the defective portions DA of the image, it is configured that the phase of the position to be referred to is offset (shifted). A method of offsetting a phase of a reference position of the threshold value matrix in such a manner is a method disclosed in JP5791155B. By doing so, the threshold value matrix can be continuously referred to even in defective nozzle portions. Thus, occurrence of artifacts in not only the boundary portion but also the correction portion can be suppressed.

Example of Processing Flow

Figure 4:
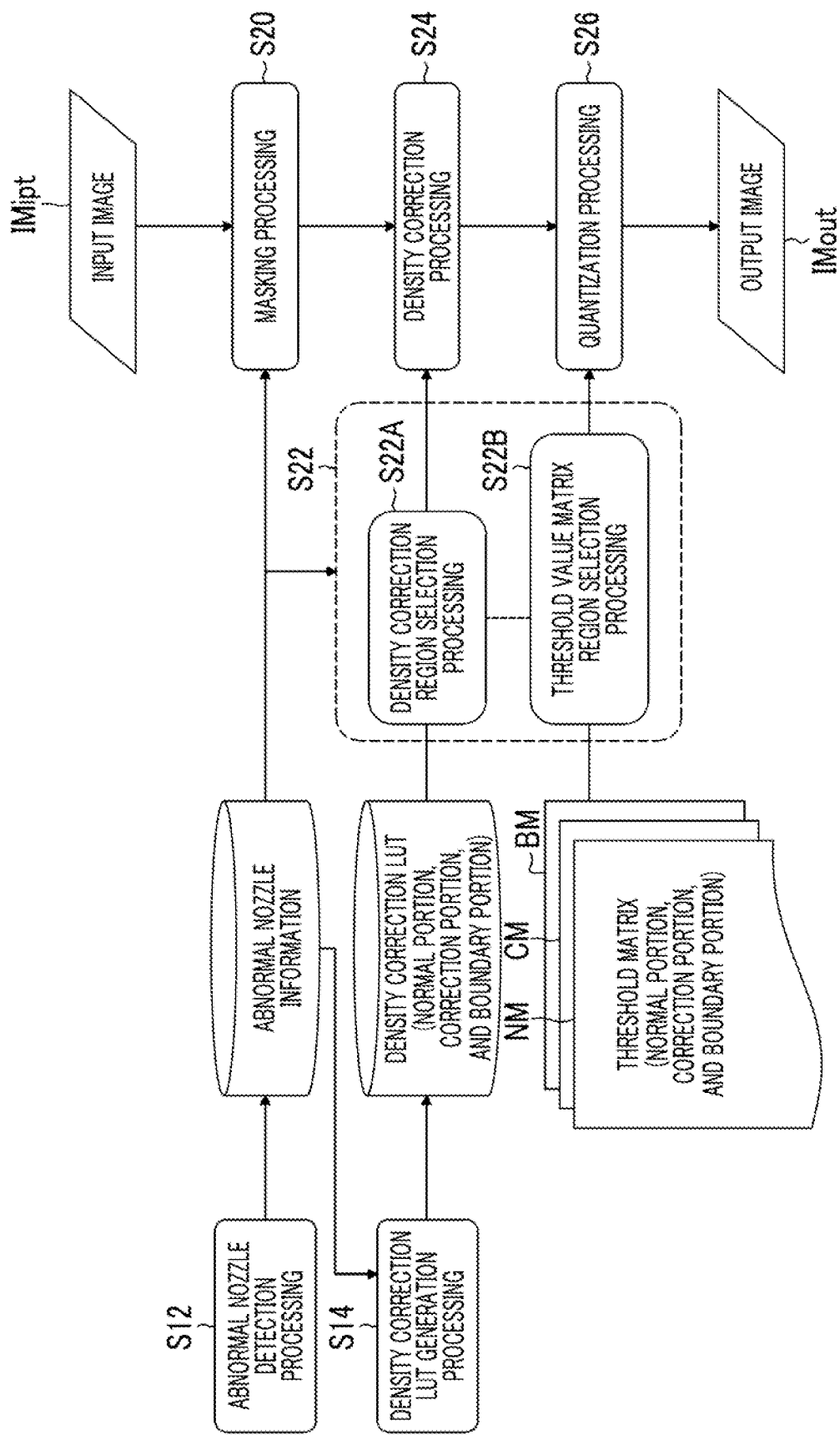
FIG. 4 is a flowchart illustrating an example of a processing content based on an image processing method according to an embodiment of the present invention.

FIG. 4 is a flowchart illustrating an example of a processing content based on the image processing method according to the embodiment of the present invention. An operation illustrated in the flowchart illustrated in FIG. 4 is executed by an image processing apparatus, not illustrated. For example, the image processing apparatus may be configured with a combination of hardware and software of a computer. The software is synonymous with a "program". A programmable controller is included in a concept of computer. A part or all of processing functions of the image processing apparatus may be implemented using an integrated circuit represented by a field programmable gate array (FPGA) or an application specific integrated circuit (ASIC).

The image processing method according to the present embodiment includes defective nozzle detection processing (step S12), density correction look-up table (LUT) generation processing (step S14), masking processing for the defective nozzle (S20), a region selection processing step (step S22), density correction processing (step S24), and quantization processing (step S26).

In the image processing method according to the present embodiment, data of an input image IMipt is subjected to the density correction processing including defective nozzle correction and the quantization processing and is finally transformed into an output image IMout representing a dot image of a dot arrangement pattern appropriate for dot recording performed by the ink jet printing apparatus.

In step S12, the image processing apparatus performs the defective nozzle detection processing. The defective nozzle refers to a nozzle showing an abnormal behavior, such as a nozzle of which a jetting direction bends more than a prescribed amount, a nozzle that has a jetting droplet amount less than a predetermined amount or does not jet, or a nozzle that jets even in a case where a jetting command is not output. The defective nozzle is synonymous with an "abnormal nozzle". The defective nozzle can be specified using well-known technologies. For example, a dedicated test chart including a nozzle examination pattern for examining a jetting state of each nozzle by the ink jet printing apparatus may be output, and the defective nozzle can be specified from an output result. Specifically, the defective nozzle can be specified by drawing a line (line segment) for each nozzle by the ink jet printing apparatus, and obtaining a jetting bending amount (landing position error) from a drawing result of the line, determining presence or absence of the line, or measuring a line width of the line.

Defective nozzle information obtained by the defective nozzle detection processing is stored in a storage device such as a memory. The defective nozzle information includes a nozzle number of the defective nozzle as position information for specifying a position of the defective nozzle. The defective nozzle information may include information indicating jetting characteristics of the nozzle such as a shift amount of a landing position and/or a droplet amount.

In step S14, the image processing apparatus performs the density correction LUT generation processing. A density correction LUT can be generated using well-known technologies. For example, gamma characteristics for each nozzle are measured by outputting a screen tint of a uniform gradation by the ink jet printing apparatus using a plurality of gradations, and reading an output result. The density correction LUT for each nozzle can be generated by performing inverse transformation for uniform gamma characteristics. Adjustment for uniform output for each nozzle in accordance with the gamma characteristics of each nozzle will be referred to as calibration. The gamma characteristics are an example of "output characteristics" according to the present disclosure.

In addition, in the density correction LUT generation processing, the density correction LUT is generated such that a decrease in density caused by masking the defective nozzle is compensated by correcting image signal values of pixels corresponding to nozzles surrounding the masked defective nozzle based on the defective nozzle information. That is, the density correction LUT is generated as a table showing correction values including a component of correction on which the gamma characteristics for each nozzle are reflected, and a component of the defective nozzle correction (non-jetting correction) that reduces visibility of a streak caused by the defective nozzle. The density correction LUT obtained by the density correction LUT generation processing is stored in the storage device such as the memory.

In a case where the data of the input image IMipt is input into the image processing apparatus, in step S20, the image processing apparatus performs processing of associating pixels of the input image IMipt with nozzles performing recording for each pixel and performs the masking processing on the defective nozzle based on the defective nozzle information. The masking processing (step S20) may be performed during the density correction processing (step S26) and/or the quantization processing (step S28).

In step S22, the image processing apparatus performs region selection processing. The region selection processing is processing of deciding which threshold value matrix or which density correction LUT is to be referred to in which pixel region in the input image IMipt based on the defective nozzle information. That is, the region selection processing is processing of deciding which of the "normal portion", the "correction portion", the "left boundary portion", and the "right boundary portion" is selected based on the defective nozzle information.

The region selection processing includes density correction region selection processing (step S22A) and threshold value matrix region selection processing (step S22B). These region selection processing may be in connection with each other between region selection for the threshold value matrix and region selection for density correction. That is, the same region may be set by both region selection processing, or setting may be performed independently of each other.

In a case where the threshold value matrix is switched, density characteristics are changed. Thus, ideally, it is desirable to switch the density correction LUT in connection with switching of the threshold value matrix. However, in this case, it is necessary to hold a density correction LUT table corresponding to the threshold value matrix together, and blow-up of solutions occurs in the same manner as in switching of the threshold value matrix. Thus, a configuration of switching the density correction LUT is employed for only a region close to the defective nozzle, and a configuration of not switching the density correction LUT is available for a region relatively away from the defective nozzle, for example, a region in which the boundary portion threshold value matrix is used.

In the density correction region selection processing in step S22A, the image processing apparatus decides the density correction LUT to be referred to in the density correction processing (step S24) in accordance with positions of pixels in the input image IMipt and transmits data of the corresponding density correction LUT to the density correction processing (step S24).

In step S24, the image processing apparatus performs the density correction processing of correcting pixel values of the input image IMipt using the selected density correction LUT.

In addition, in the threshold value matrix region selection processing in step S22B, the image processing apparatus decides the threshold value matrix to be referred to in the quantization processing (step S26) in accordance with the positions of the pixels in the input image IMipt and transmits data of the corresponding threshold value matrix to the quantization processing (step S26).

Then, in step S26, the image processing apparatus quantizes the pixel values of the input image IMipt using the threshold value matrix selected for each region. The output image IMout representing the dot arrangement pattern is obtained as a result of the quantization processing.

The nozzle is an example of a "recording element" according to the present disclosure. The defective nozzle is an example of a "defective recording element" according to the present disclosure. Information obtained by the defective nozzle detection processing is an example of "information indicating recording characteristics of the recording element" according to the present disclosure. Correction of reducing the visibility of the streak caused by the defective nozzle is an example of "correction of suppressing visibility of an image defect caused by the defective recording element" according to the present disclosure. Masking of the defective nozzle is an example of "disabling" according to the present disclosure. The defective nozzle information is an example of a "defective recording element information" according to the present disclosure.

First Example of Region Selection Processing

As described using FIG. 1 to FIG. 3, the image processing apparatus performs a control for referring to the correction portion threshold value matrix CM for a pixel region near the defective nozzle, referring to the normal portion threshold value matrix NM for a region away from the defective nozzle, and referring to the boundary portion threshold value matrix BM at a boundary therebetween.

Specifically, the control can be performed as in the following flow.

Figure 5:
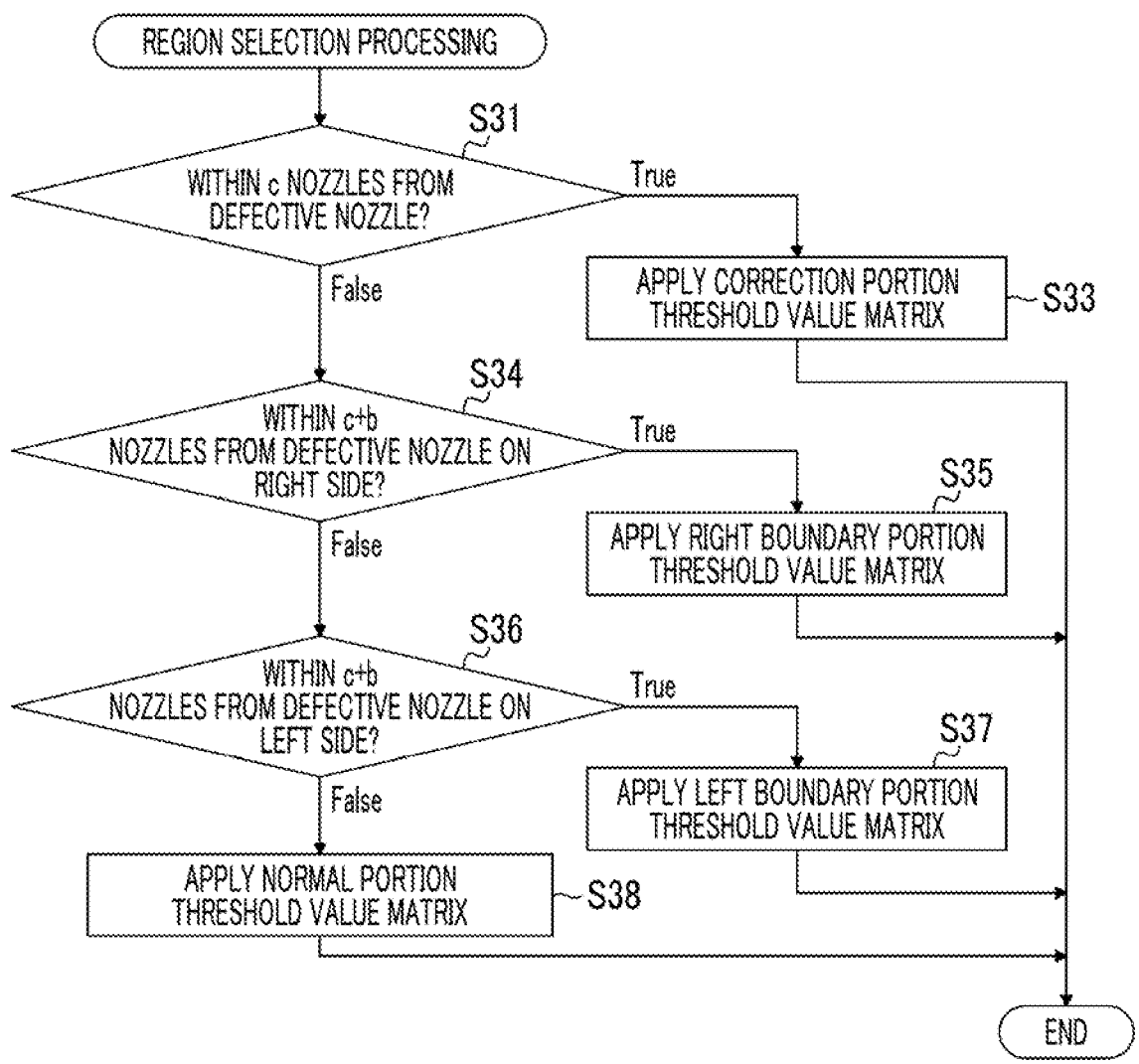
FIG. 5 is a flowchart illustrating a first example of a processing content of region selection processing.

FIG. 5 is a flowchart illustrating a first example of a processing content of the region selection processing. The flowchart in FIG. 5 is executed by a region selection processing module of the image processing apparatus. Here, it is configured that the correction portion threshold value matrix is applied to a nozzle that is away from the defective nozzle by c nozzles, the left and right boundary portion threshold value matrices are respectively applied to nozzles further away from the nozzle by b nozzles, and the normal portion threshold value matrix is applied to the other nozzles. Here, c and b are predetermined integers.

In step S31, the image processing apparatus determines whether or not an attention pixel region of a processing target is within c nozzles from the defective nozzle. In a case where a determination result of step S31 is True (positive), the image processing apparatus transitions to step S33 and applies the correction portion threshold value matrix to the attention pixel region. Meanwhile, in a case where the determination result of step S31 is False (negative), the image processing apparatus transitions to step S34.

In step S34, the image processing apparatus determines whether or not the attention pixel region is within c+b nozzles from the defective nozzle on a right side. In a case where a determination result of step S34 is True (positive), the image processing apparatus transitions to step S35 and applies the right boundary portion threshold value matrix to the attention pixel region. Meanwhile, in a case where the determination result of step S34 is False (negative), the image processing apparatus transitions to step S36.

In step S36, the image processing apparatus determines whether or not the attention pixel region is within c+b nozzles from the defective nozzle on a left side. In a case where a determination result of step S36 is True (positive), the image processing apparatus transitions to step S37 and applies the left boundary portion threshold value matrix to the attention pixel region. Meanwhile, in a case where the determination result of step S36 is False (negative), the image processing apparatus transitions to step S38.

In step S38, the image processing apparatus applies the normal portion threshold value matrix to the attention pixel region. After step S33, S35, S37, or S38, the image processing apparatus finishes the flowchart in FIG. 5.

A specific setting example of values of c and b is illustrated in FIG. 6 to FIG. 11.

Figure 6:
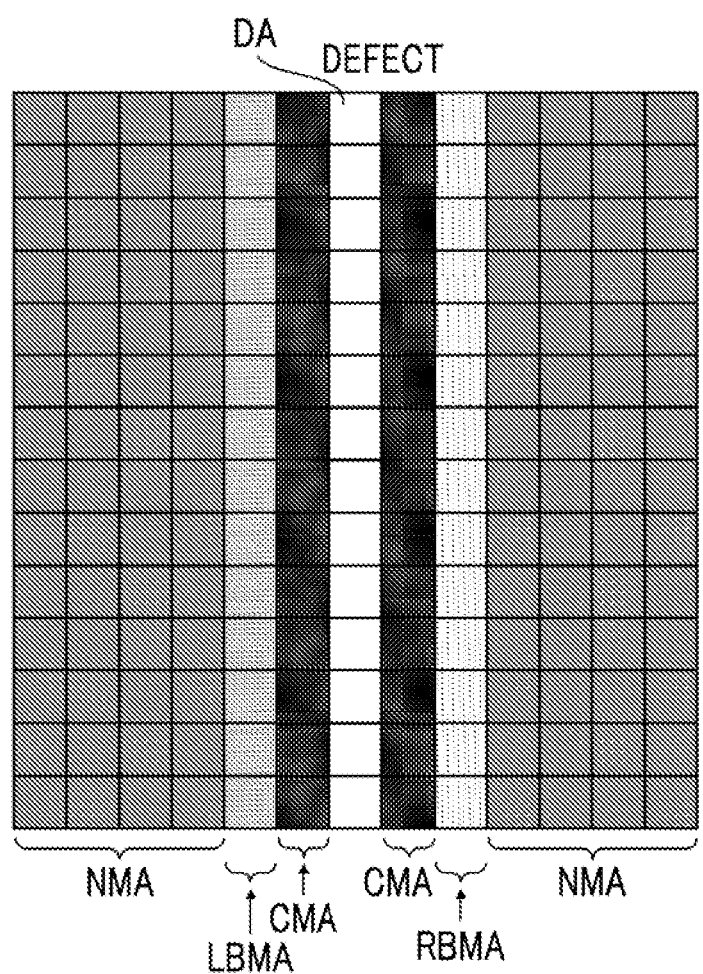
FIG. 6 is a descriptive diagram illustrating an application example of a threshold value matrix in a case of setting c=1 and b=1.
Figure 7:
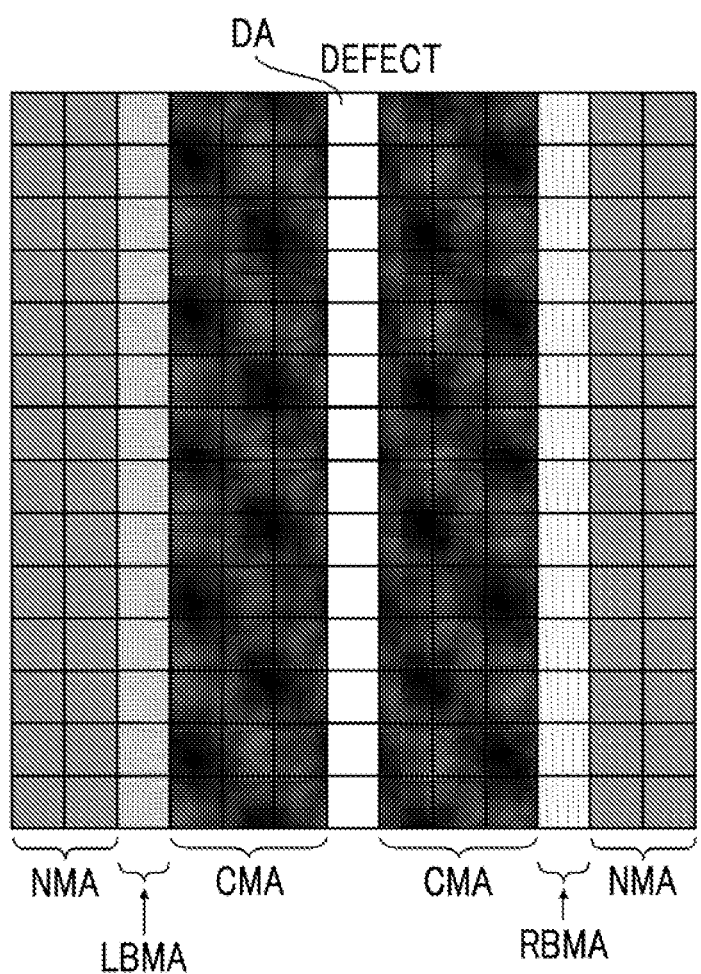
FIG. 7 is a descriptive diagram illustrating an application example of the threshold value matrix in a case of setting c=3 and b=1.
Figure 8:
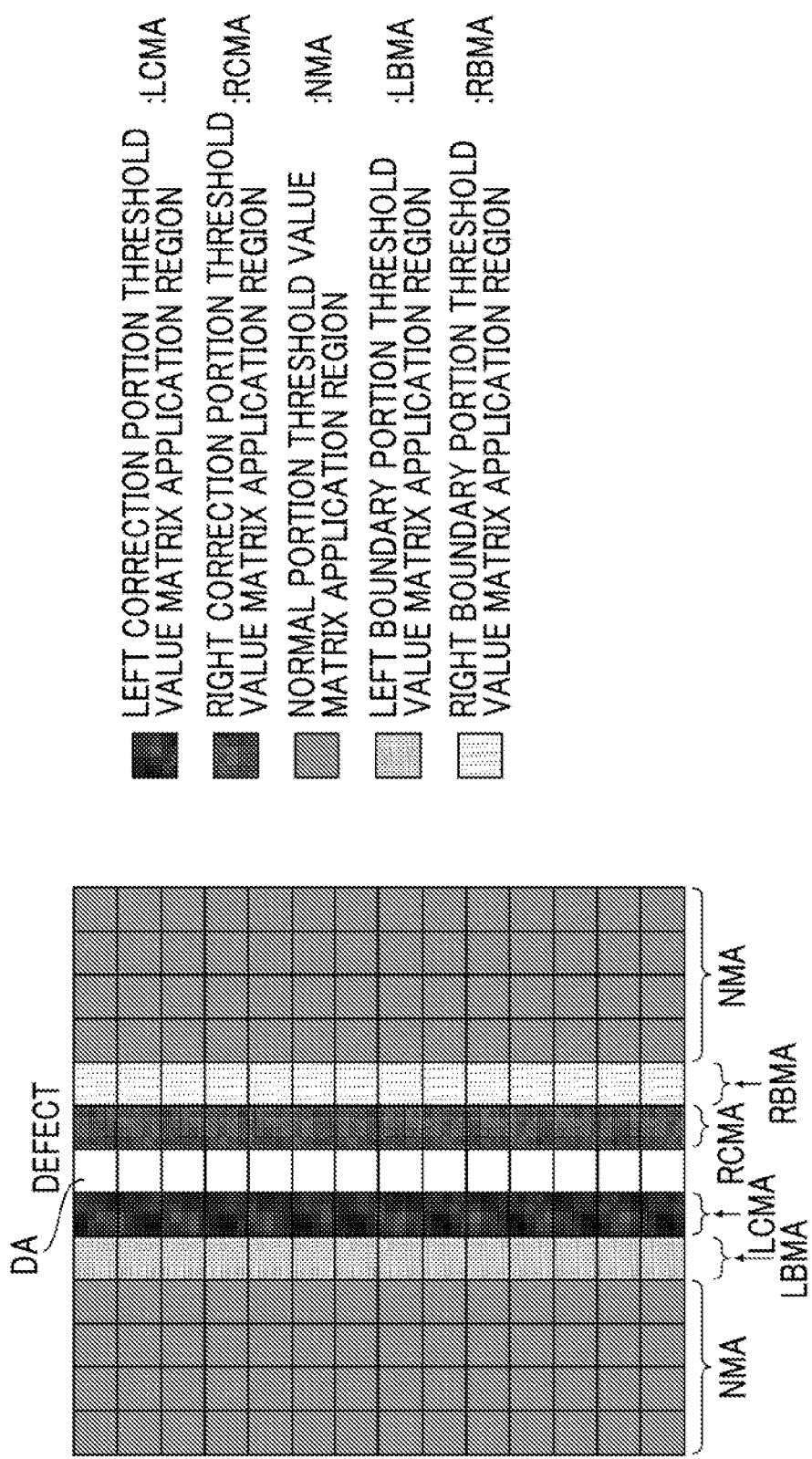
FIG. 8 is a descriptive diagram illustrating an application example of the threshold value matrix in a case of setting c=1 and b=1.

FIG. 6 illustrates an application example of the threshold value matrix in a case of setting c=1 and b=1. FIG. 7 illustrates an application example of the threshold value matrix in a case of setting c=3 and b=1. FIG. 8 illustrates an application example of the threshold value matrix in a case of setting c=1 and b=1. However, in FIG. 8, an example of employing different threshold value matrices at the left and right of the defective nozzle as the correction portion threshold value matrix is illustrated. That is, in the case illustrated in FIG. 8, a left correction portion threshold value matrix LCM is applied on the left side of the defective nozzle, and a right correction portion threshold value matrix RCM is applied on the right side. That is, in FIG. 8, a region (left correction portion) of a pixel column adjacent to the defective portion DA on the left side is a left correction portion threshold value matrix application region LCMA, and a region (right correction portion) of a pixel column adjacent to the defective portion DA on the right side is a right correction portion threshold value matrix application region RCMA.

Figure 9:
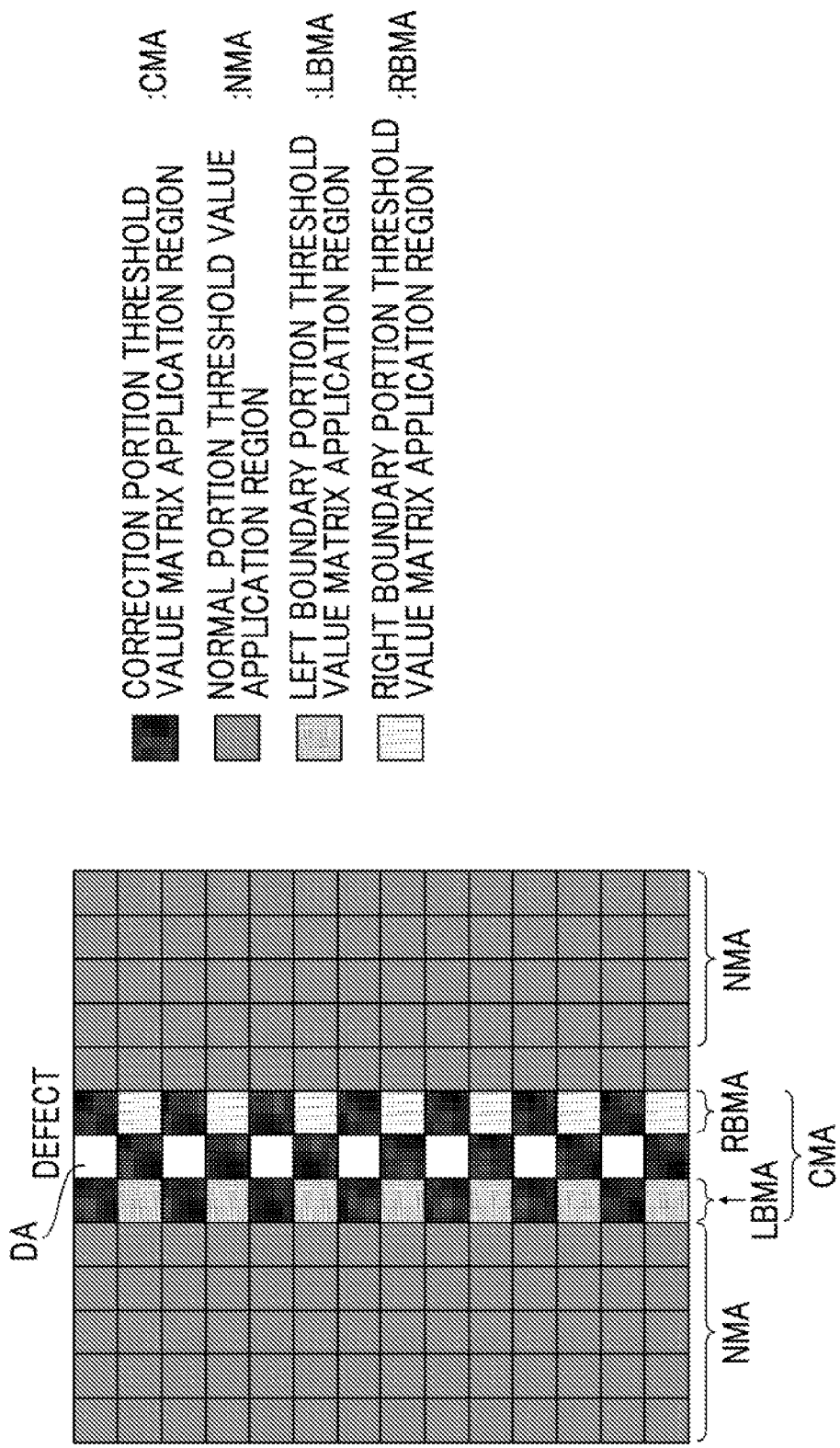
FIG. 9 is a descriptive diagram illustrating an application example of the threshold value matrix in a case of setting c=1 and b=1 and illustrates an example of a case of recording the same pixel column using two nozzles.
Figure 10:
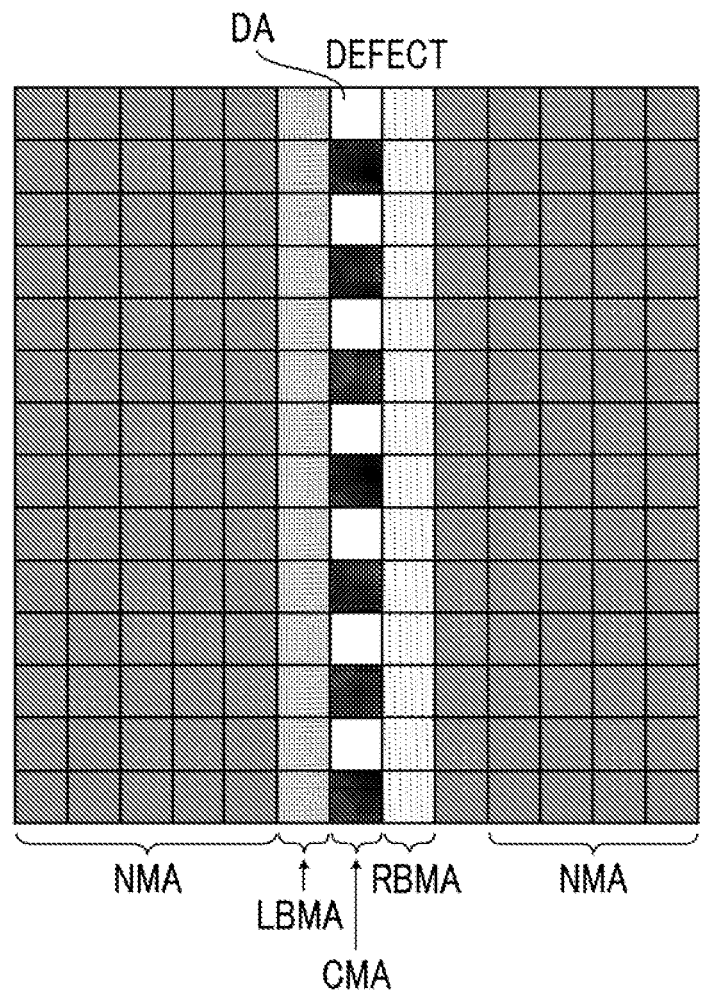
FIG. 10 is a descriptive diagram illustrating an application example of the threshold value matrix in a case of setting c=0 and b=1 and illustrates an example of a case of recording the same pixel column using two nozzles.
Figure 11:
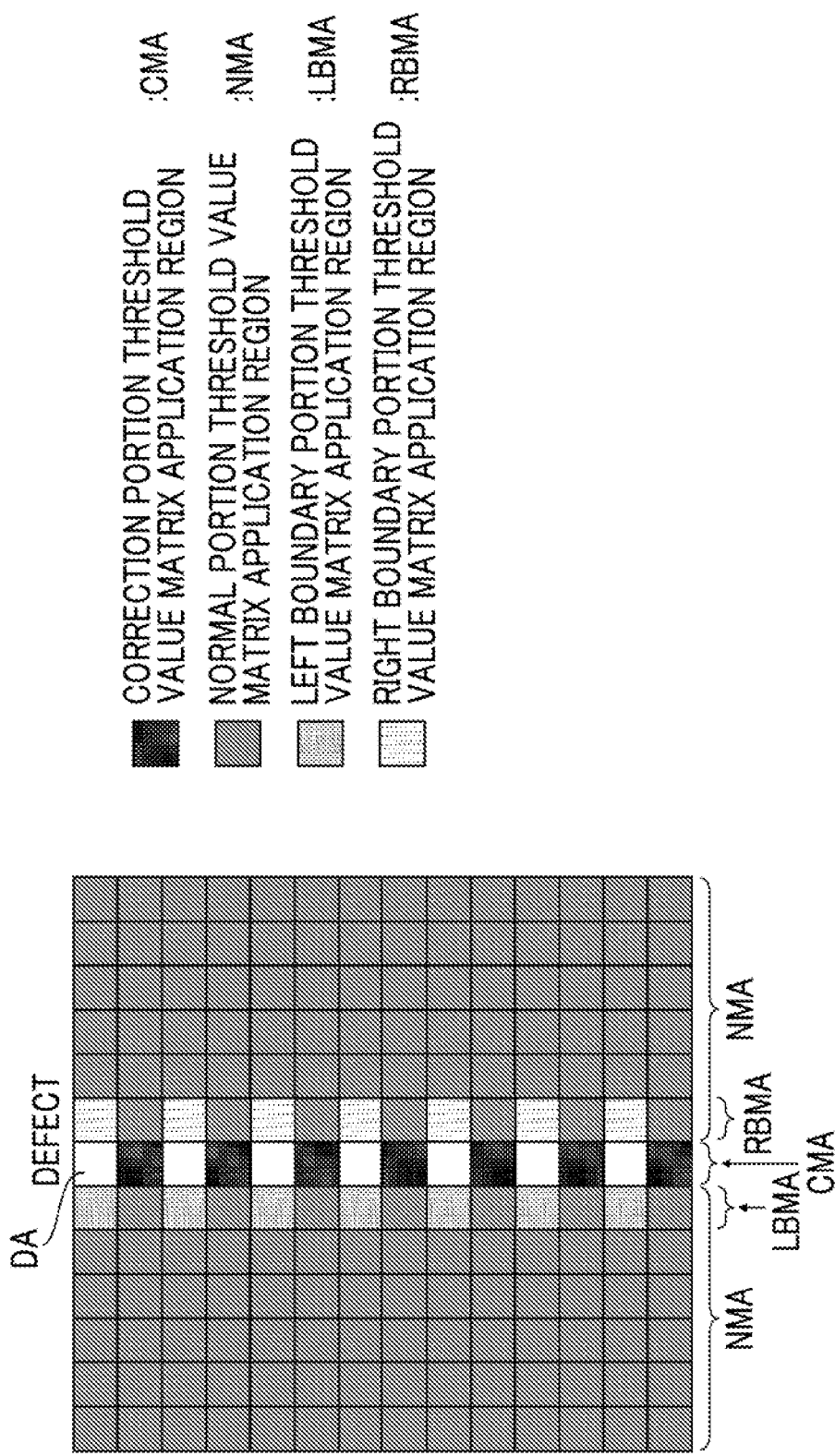
FIG. 11 is a descriptive diagram illustrating an application example of the threshold value matrix in another case of setting c=0 and b=1 and illustrates an example of a case of recording an identical pixel column using two nozzles.

FIG. 9 to FIG. 11 illustrate an example of a case of recording the same pixel column using two nozzles. While an example of printing the same pixel column using one nozzle has been described thus far, the present disclosure can also be applied to a configuration of recording the same pixel column using a plurality of nozzles. For example, in an ink jet printing apparatus comprising a plurality of line-type ink jet heads jetting ink of the same color, a configuration of recording the same pixel column using a plurality of nozzles is implemented.

FIG. 9 illustrates an application example of the threshold value matrix in a case of setting c=1 and b=1. FIG. 10 illustrates an application example of the threshold value matrix in a case of setting c=0 and b=1. FIG. 11 illustrates another application example of the threshold value matrix in a case of setting c=0 and b=1.

A distance indicated by a value of "c+b" described in FIG. 5 to FIG. 11 is an example of a "first distance" according to the present disclosure.

Figure 12:
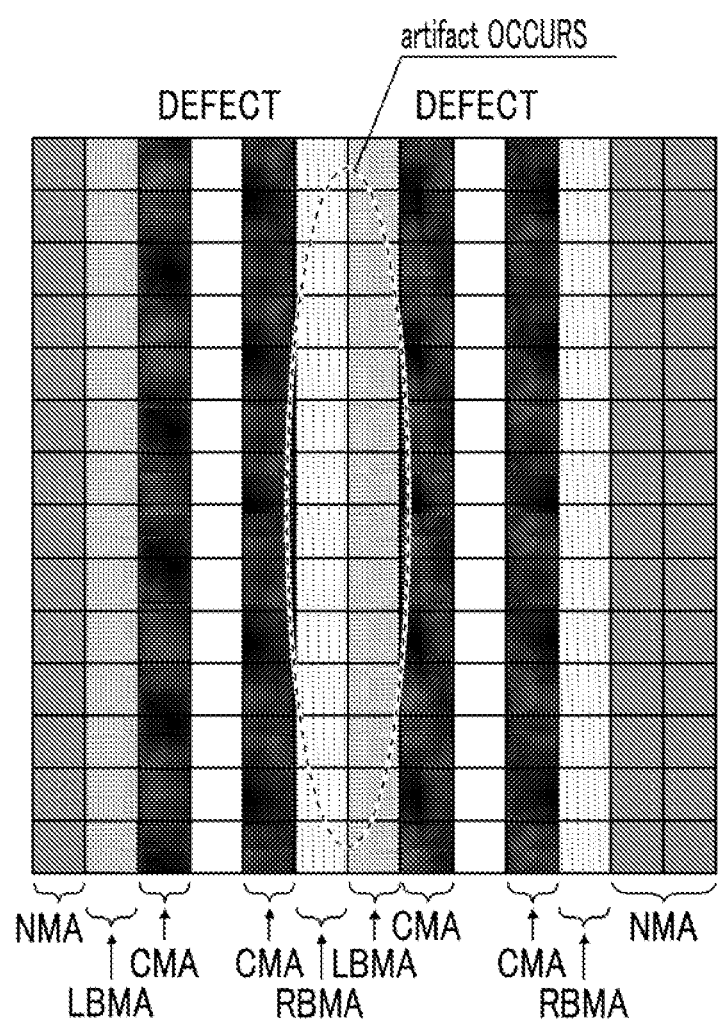
FIG. 12 is a descriptive diagram illustrating a problem in a case where defective nozzles occur in a concentrated manner.

Example of Countermeasure Assuming Case Where Defective Nozzles Are Concentrated While a basic example of the region selection processing is illustrated in FIG. 5 to FIG. 11, the artifact may not always be suppressed in a case where a plurality of defective nozzles are present in a recording head, and the plurality of defective nozzles are nearby. FIG. 12 is an example of performing correction using the method illustrated in FIG. 5 in a case where defective nozzles occur apart by five nozzles. In this case, the left boundary portion threshold value matrix LBM and the right boundary portion threshold value matrix RBM are adjacent in intermediate nozzles between the two defective nozzles. Matrices of both of the left boundary portion threshold value matrix LBM and the right boundary portion threshold value matrix RBM are generated on an assumption that adjacent threshold value matrices of each matrix are the normal portion threshold value matrix and the correction portion threshold value matrix. Accordingly, as in a pixel region surrounded by a broken line in FIG. 12, a point of discontinuity of the threshold value matrix occurs in a part in which the left boundary portion threshold value matrix LBM and the right boundary portion threshold value matrix RBM are adjacent, and becomes the artifact. Thus, a problem arises in that the streak caused by the defective nozzles is not clearly removed.

As a countermeasure for this problem, processing may be performed such that the correction portion threshold value matrix CM is used for the entire region surrounded by the defective nozzles in a case where the defective nozzles are nearby.

By doing so, continuity of the threshold value matrix is maintained. Thus, even in a case where defective nozzles are concentrated, correction can be appropriately performed without occurrence of the artifact.

Values of c and b are decided following the example described using FIG. 5. Furthermore, a nozzle distance between the two defective nozzles is denoted by d. In this case, in a case where a condition illustrated in Expression 1 below is satisfied, the left and right boundary portion threshold value matrices are adjacent at a boundary or overlaps. Thus, it is better to replace the threshold value matrix to be applied to the pixel region between the defective nozzles with the correction portion threshold value matrix.

$$d \leq 2(c+b)+1 \quad \text{(Expression 1)}$$

Meanwhile, as another cause, in a case where a mutual action between a plurality of (left and right) correction portion threshold value matrices is not sufficiently considered, there is a possibility of occurrence of the artifact in a case where the replaced threshold value matrices are concentrated. In such a case, it is desirable to apply a condition illustrated in Expression 2 below instead of a conditional expression illustrated in Expression 1, and replace the threshold value matrix to be applied to the pixel region between the defective nozzles with the correction portion threshold value matrix in a case where the condition of Expression 2 is satisfied.

$$d \leq 2(c+b)+1+V \quad \text{(Expression 2)}$$

In Expression 2, "V" is a distance decided from vision frequency characteristics of a person and is decided such that a frequency range in which a difference in contrast is likely to be visually recognized is avoided. While V depends on an observation distance or the like in a strict sense, for example, V may be set to approximately 1 millimeter [mm].

A value illustrated on a right side of Expression 1 or a value illustrated on a right side of Expression 2 is an example of a "second distance" according to the present disclosure.

Figure 13:
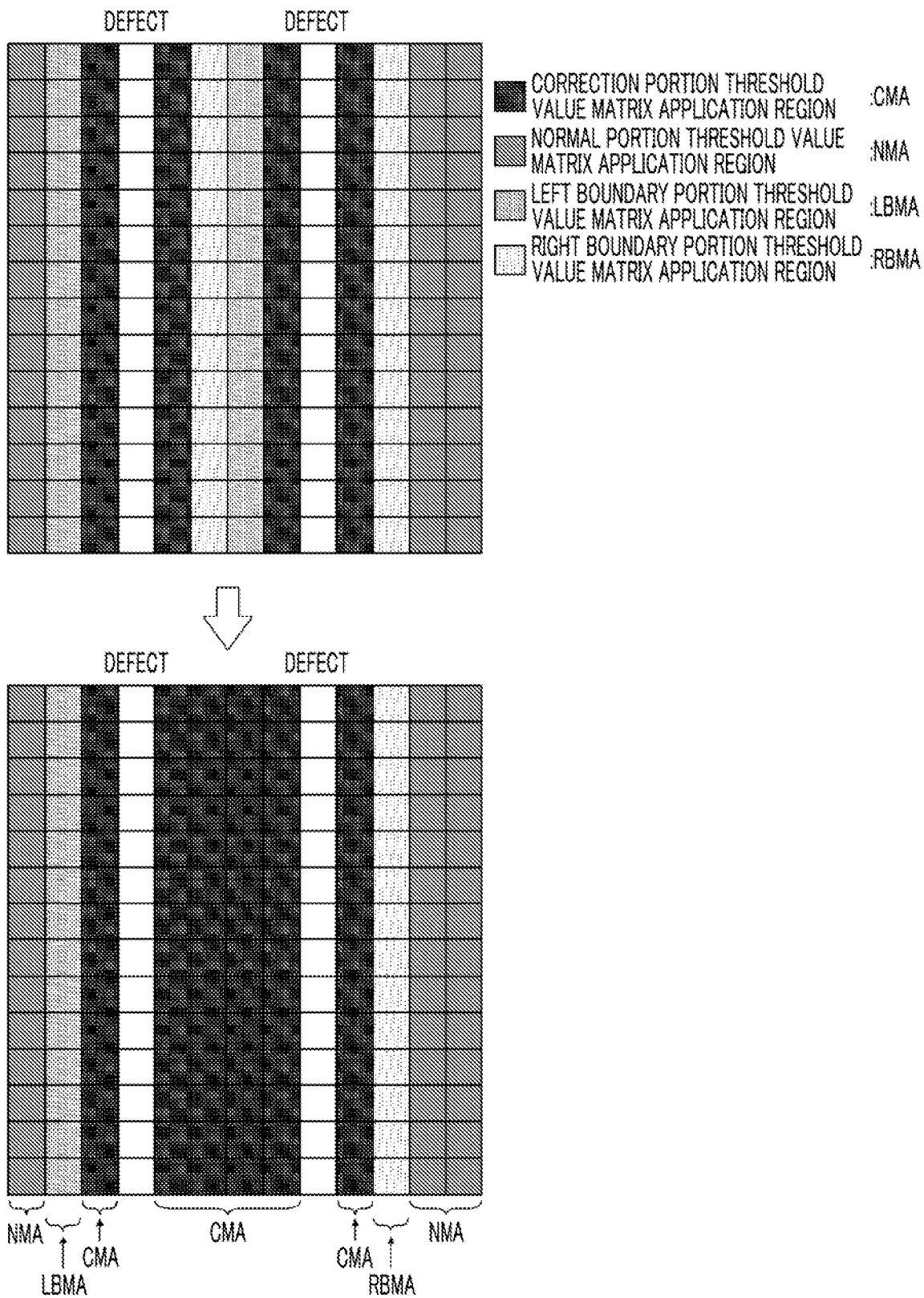
FIG. 13 is a diagram illustrating an example of the region selection processing considering a situation where defective nozzles are concentrated.

FIG. 13 illustrating an example of the region selection processing considering a situation where defective nozzles are concentrated. Processing as illustrated in FIG. 13 can be handled by correcting the flowchart described using FIG. 5 as illustrated in FIG. 14.

Figure 14:
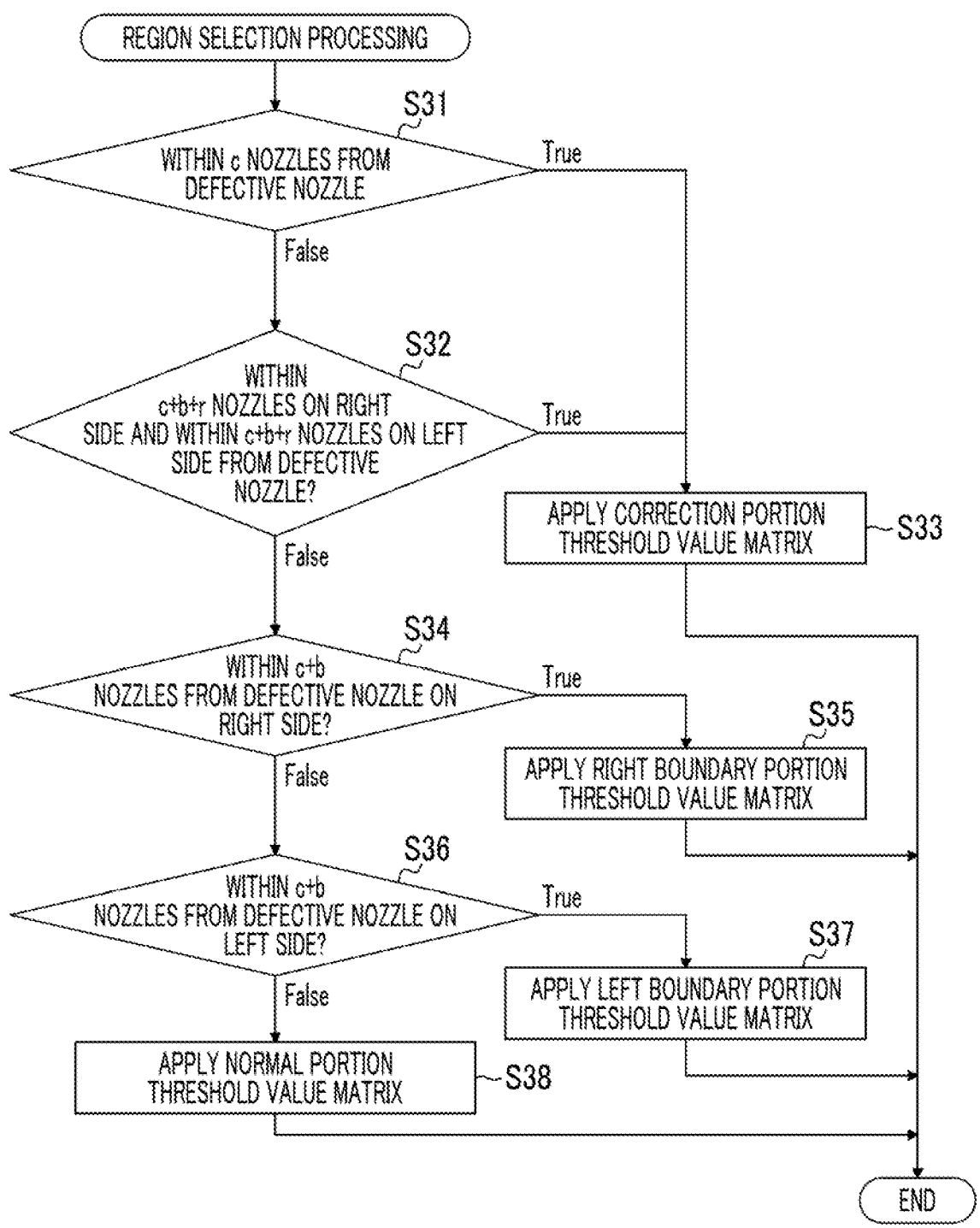
FIG. 14 is a flowchart illustrating a second example of the processing content of the region selection processing.

FIG. 14 is a flowchart illustrating a second example of the processing content of the region selection processing. Differences from FIG. 5 will be described for FIG. 14. In the flowchart in FIG. 14, step S32 is added between step S31 and step S34 in FIG. 5.

In a case where the determination result of step S31 is a False determination, the image processing apparatus transitions to step S32. In step S32, the image processing apparatus determines whether or not the attention pixel region is within c+b+r nozzles on the right side and within c+b+r nozzles on the left side from the defective nozzle. Here, r may be an appropriate value greater than or equal to zero that is decided considering Expression 1 or Expression 2.

In a case where a determination result of step S32 is a True determination, the image processing apparatus transitions to step S33 and applies the correction portion threshold value matrix to the attention pixel region. Meanwhile, in a case where the determination result of step S32 is a False determination, the image processing apparatus transitions to step S34. The other processing is the same as the flowchart in FIG. 5.

Specific Example of Density Correction Processing and Quantization Processing

Figure 15:
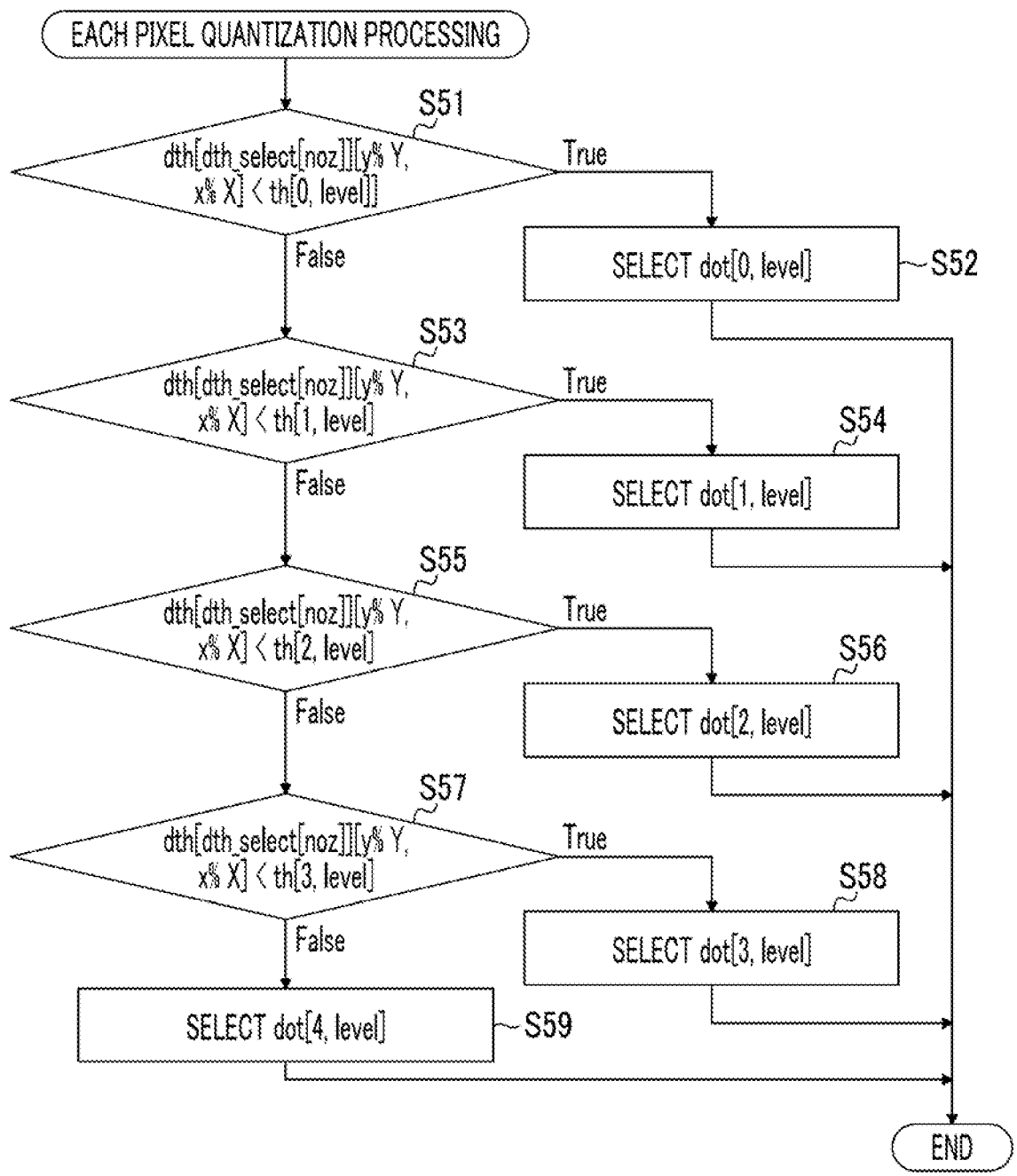
FIG. 15 is a flowchart illustrating a specific example of density correction processing and the quantization processing.

FIG. 15 is a flowchart illustrating a specific example of the density correction processing and the quantization processing.

Meanings of symbols in the drawing are as follows.

noz: quantization target nozzle
   x, y: quantization target address
   dth[n][x, y]: value of threshold value matrix that is component at position (x, y) of n-th threshold value matrix
   X, Y: size of threshold value matrix
   dth_select[noz]: threshold value matrix region selection table
   level: gradation value after density correction
   As in an expression below, the density correction is performed by switching a gamma table for each nozzle.

level=gamma[gamma_select[noz],input_image[y,x]]

gamma_select: density correction region selection table
   th[i, level]: threshold value to be compared with threshold value matrix
   Here, th[i, level] is defined depending on the gradation value (level) (i=0, 1, 2, and 3).
   dot[n, level]: dot value that can be designated for each gradation value (level)

For example, the dot value is a value corresponding to four types of no droplet, a small droplet, a medium droplet, and a large droplet that are defined as "0=no droplet", "1=small droplet", "2=medium droplet", and "3=large droplet", respectively. Here, dot[n, level] is stored in a look-up table using a pixel value as a parameter.

In representation of [y%Y, x%X], [%] denotes a modulo operator. Here, y%Y is a remainder of a variable y divided by a variable Y.

In the present example, total four types of threshold value matrices of the normal portion threshold value matrix NM, the correction portion threshold value matrix CM, the left boundary portion threshold value matrix LBM, and the right boundary portion threshold value matrix RBM are prepared, and a value n for specifying the threshold value matrix to be referred to is described for each nozzle in the threshold value matrix selection table dthselect[noz]. For example, the value n for specifying the threshold value matrix is defined as "0=normal portion threshold value matrix", "1=correction portion threshold value matrix", "2=left boundary portion threshold value matrix", and "3=right boundary portion threshold value matrix".

The flowchart illustrated in FIG. 15 is executed by a processor that functions as a quantization processing portion in the image processing apparatus. The quantization processing portion may be a program module.

In the quantization, the threshold value matrix (dth[n]) to be used is switched for each nozzle using dth_select[noz], that is, by the region selection processing for the threshold value matrix. In addition, an image signal value (pixel value) to be compared is subjected to gamma transformation using gamma_lut. Here, gamma_lut is switched for each nozzle using lut_select[noz], that is, by the region selection processing (density correction region selection processing) for the density correction processing. Accordingly, a ratio, density (jetting ink amount), or the like of droplets can be adjusted in accordance with the position of the defective nozzle. By combining these, dot arrangement implementing a uniform density distribution is decided.

The gradation value level after density correction for each pixel may be calculated in advance before step S51 in FIG. 15 is started.

In a case where each pixel quantization processing illustrated in FIG. 15 is started, the quantization processing portion divides a region of the image by referring to the corresponding threshold value matrix from the threshold value matrix region selection table in accordance with the quantization target nozzle [noz] corresponding to the quantization target address (x, y) and comparing a value dth [dth_select[noz]] [y%Y, x%X] of a component of the threshold value matrix with the threshold value th[i, level].

The threshold value th[i, level] is set for each gradation value (level) of a target pixel and is stored in advance in a predetermined memory. In the present example, division into five regions is performed using a first threshold value th[0, level], a second threshold value th[1, level], a third threshold value [2, level], and a fourth threshold value [3, level].

First, in step S51, the quantization processing portion compares the value of the threshold value matrix with the first threshold value th[0, level]. In a case where the value of the threshold value matrix is smaller as a result of comparison in step S51, a dot size designated by dot[0, level] is selected (step S52).

In a case where the value of the threshold value matrix is greater than or equal to the first threshold value in a comparison result of step S51, the quantization processing portion transitions to step S53 and compares the value of the threshold value matrix with the second threshold value th[1, level]. In a case where the value of the threshold value matrix is smaller as a result of comparison in step S53, a dot size designated by dot[1, level] is selected (step S54).

In a case where the value of the threshold value matrix is greater than or equal to the second threshold value in a comparison result of step S53, the quantization processing portion transitions to step S55 and compares the value of the threshold value matrix with the third threshold value th[2, level]. In a case where the value of the threshold value matrix is smaller as a result of comparison in step S55, a dot size designated by dot[2, level] is selected (step S56).

In a case where the value of the threshold value matrix is greater than or equal to the third threshold value in a comparison result of step S55, the quantization processing portion transitions to step S57 and compares the value of the threshold value matrix with the fourth threshold value th[3, level]. In a case where the value of the threshold value matrix is smaller as a result of comparison in step S57, a dot size designated by dot[3, level] is selected (step S58).

In addition, in a case where the value of the threshold value matrix is greater than the fourth threshold value in a comparison result of step S57, a dot size designated by dot[4, level] is selected (step S59).

The dot size of dot[j, level] of each of j=0 to 4 can be appropriately decided for each gradation value. For example, for a certain gradation value, it is possible to decide dot[0, level] as the small droplet, dot[1, level] as the medium droplet, dot[2, level] as no droplet, dot[3, level] as the large droplet, and dot[4, level] as the large droplet.

After step S52, S54, S56, S58, or S59, the quantization processing portion finishes the flowchart in FIG. 15. The quantization processing portion executes the flowchart in FIG. 15 for each pixel.

<<Threshold Value Matrix Set>>

Next, the threshold value matrix to be used in the quantization processing of the present embodiment will be described.

[Normal Portion Threshold Value Matrix]

For example, the normal portion threshold value matrix is generally optimized for improving granularity and suppressing unevenness. In the present example, the same optimization can be performed. Well-known technologies can be employed for the optimization.

In addition, in a case of using the threshold value matrix by switching as in the present example, a boundary between the normal portion threshold value matrix and the correction portion threshold value matrix can be smoothly connected without the artifact by creating the normal portion threshold value matrix as follows.

(1) The normal portion and the correction portion have the same or similar pattern frequency characteristics to the threshold value matrix.

(2) The threshold value matrix is created by referring to a common pattern of the threshold value matrix in the normal portion and the correction portion.

That is, it is preferable to generate the correction portion threshold value matrix by referring to a common pattern of at least one of a first pattern generated from the normal portion threshold value matrix or a second pattern used in a case of generating the normal portion threshold value matrix.

[Correction Portion Threshold Value Matrix]

It is necessary to create the correction portion threshold value matrix such that the artifact does not occur in the correction portion. For example, a technology disclosed in the following document is present as a method of implementation.

[1] Technology Disclosed in WO2018/181166A

A threshold value matrix for non-jetting correction disclosed in the WO2018/181166A specification causes a peak frequency component of quantization to be positioned in a frequency band excluding a frequency band near a spatial frequency peak of a correction region.

By using the technology disclosed in this document, for example, in a case where the same pixel column is recorded by a plurality of nozzles as in FIG. 9, occurrence of the artifact can be suppressed even in a case where the threshold value matrix is discontinuously referred to.

[2] Technology Disclosed in JP5916642B

A threshold value matrix created using a method disclosed in the JP5916642B specification has first pattern characteristics in which a spatial frequency component in a first direction parallel to a relative movement direction of a recording medium with respect to a recording head is suppressed with respect to all spatial frequency components in a second direction orthogonal to the first direction. By using the technology disclosed in this document, for example, in a case where the same pixel column is recorded by a single nozzle as in FIG. 2, occurrence of the artifact can be suppressed even in a case where the threshold value matrix is discontinuously referred to.

[3] Technology Disclosed in the JP5791155B Specification

According to a method disclosed in the JP5791155B specification, a threshold value matrix correction step of correcting a correspondence relationship between a recording element and a threshold value such that processing of a pixel to be formed by an abnormal recording element subjected to the masking processing is excluded, and that continuity of a pattern of the threshold value matrix is maintained is included. The quantization processing is performed using this corrected threshold value matrix.

By using the technology disclosed in this document, for example, as illustrated in FIG. 3, the correction portion threshold value matrix is continuously referred to. Thus, the defective nozzle can be corrected without the artifact.

The correction portion threshold value matrix may be generated independently of the normal portion threshold value matrix. By generating the threshold value matrices independently of each other, different pattern characteristics appropriate for each of the normal portion and the correction portion can be applied. Thus, high-quality correction processing and quantization processing corresponding to each region can be performed.

Meanwhile, as described above, the threshold value matrix can also be generated such that the normal portion threshold value matrix and the correction portion threshold value matrix are similar. By generating the threshold value matrix in such a manner, a boundary between both threshold value matrices can be smoothly connected without the artifact.

[Boundary Portion Threshold Value Matrix]

A role of the boundary portion is to smoothly connect the normal portion threshold value matrix to the correction portion threshold value matrix without the artifact. Such a pattern can be implemented as follows.

[Method 1] The threshold value matrix of any of the normal portion, the correction portion, and the boundary portion has the same or similar pattern frequency characteristics.

[Method 2] The threshold value matrix is generated by referring to a common pattern of the threshold value matrix of each of the normal portion, the correction portion, and the boundary portion.

In a case of Method 1 and Method 2, it is also possible to maintain only one threshold value matrix of the boundary portion.

As another example, the threshold value matrix can be generated by deciding dot arrangement by arranging a pattern of the normal portion and a pattern of the correction portion and deciding dot arrangement such that a low frequency component of a pattern frequency is suppressed for a pattern in a region between the normal portion and the correction portion. For example, the boundary portion threshold value matrix is generated using a first threshold value matrix pattern that is dot arrangement implemented by the normal portion threshold value matrix, and a second threshold value matrix pattern that is dot arrangement implemented by the correction portion threshold value matrix, such that a low frequency component of a pattern in which the first threshold value matrix pattern and the second threshold value matrix pattern are combined is suppressed.

In addition, in a case where the threshold value matrix of the normal portion and the threshold value matrix of the correction portion are present in reverse at the left and the right, optimal patterns are different in a strict sense. Thus, it is preferable to selectively apply a plurality of types of boundary portion threshold value matrices in accordance with a position relationship between the threshold value matrix of the normal portion and the threshold value matrix of the correction portion. That is, it is desirable to generate a plurality of types of threshold value matrices such as the boundary portion threshold value matrix on the right side of the correction portion and the boundary portion threshold value matrix on the left side.

A method of efficiently generating the left and right boundary portion threshold value matrices will be illustrated below.

Figure 16:
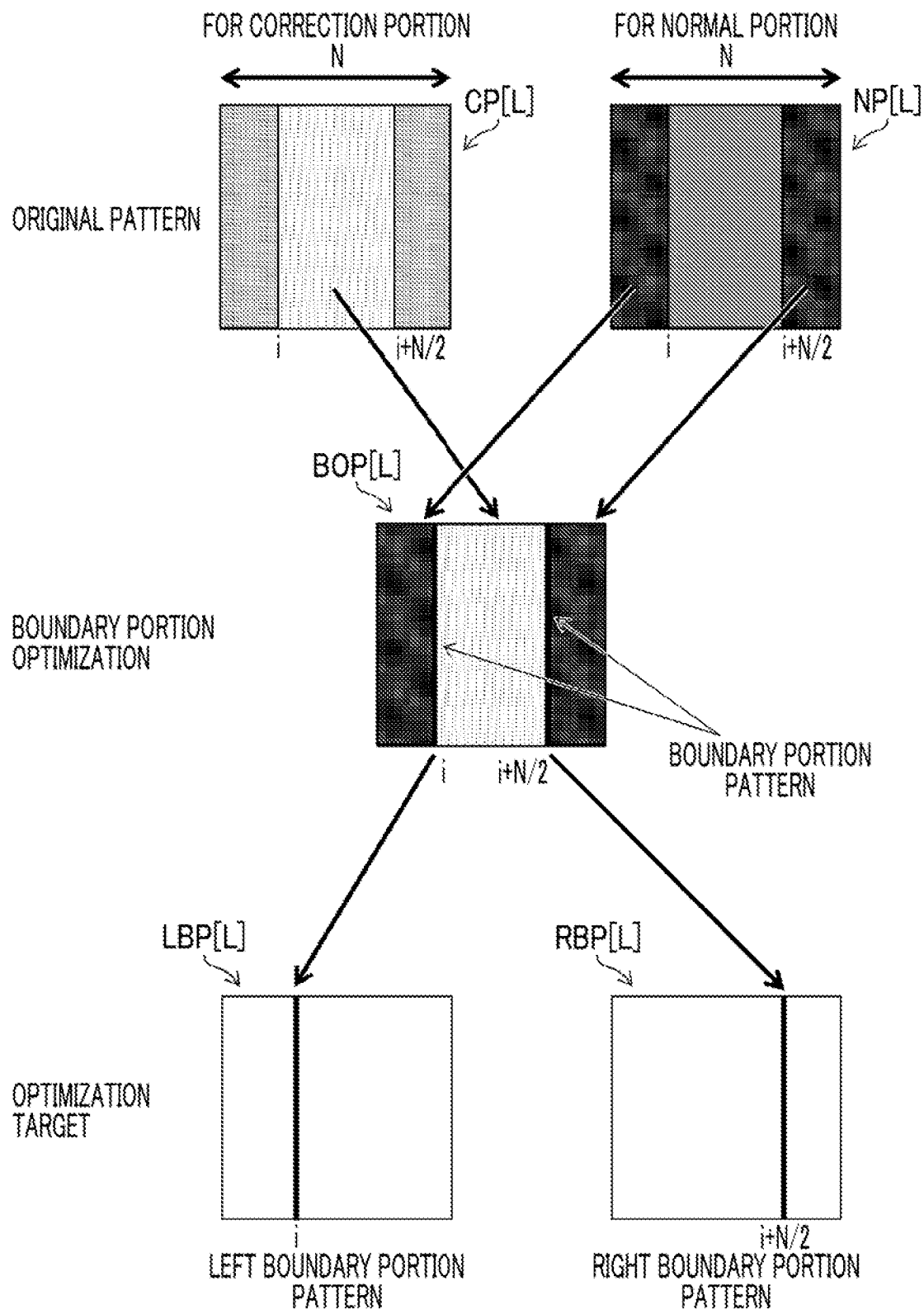
FIG. 16 is a descriptive diagram illustrating a summary of a method of generating a boundary portion threshold value matrix.

FIG. 16 is a descriptive diagram illustrating a summary of a method of generating the boundary portion threshold value matrix. In order to generate the boundary portion threshold value matrix, the normal portion threshold value matrix and the correction portion threshold value matrix are prepared. It is assumed that a size of each of these threshold value matrices in a nozzle arrangement direction (X direction) is N.

It is assumed that a pattern of a gradation value L generated from the normal portion threshold value matrix is a normal portion original pattern NP[L] of the gradation value L. Similarly, it is assumed that a pattern of the gradation value L generated from the correction portion threshold value matrix is a correction portion original pattern CP[L] of the gradation value L.

A boundary portion optimization pattern BOP[L] of which a size in the nozzle arrangement direction is N is generated as a pattern for optimizing the boundary portion.

The pattern of the gradation value L generated from the normal portion threshold value matrix is arranged at each position corresponding to a pixel position of 0 to i−1 and (i+N/2)+1 to N of the boundary portion optimization pattern BOP[L] in the X direction. That is, a pattern of a corresponding region of the normal portion original pattern NP[L] is arranged at each position corresponding to 1 to i−1 and (i+N/2)+1 to N of the boundary portion optimization pattern BOP[L].

In addition, the pattern of the gradation value L generated from the correction portion threshold value matrix is arranged at each position corresponding to a pixel position of i+1 to N/2−1 of the boundary portion optimization pattern BOP[L] in the X direction. That is, a pattern of a corresponding region of the correction portion original pattern CP[L] is arranged at each position corresponding to i+1 to N/2−1 of the boundary portion optimization pattern BOP[L].

Then, a pattern that suppresses an increase in low frequency component of the entire pattern frequency is decided at each position of a position i and a position i+N/2.

In the boundary portion optimization pattern BOP[L] generated in such a manner, a pattern of the position i is maintained as a pattern of the gradation value L of the left boundary portion threshold value matrix LBM at the position i, and a pattern of the position i+N/2 is maintained as a pattern of the gradation value L of the right boundary portion threshold value matrix RBM at the position i+N/2. That is, by deciding the boundary portion optimization pattern BOP [L] to be an appropriate pattern, a left boundary portion pattern and a right boundary portion pattern can be optimized at the same time.

By performing such processing for the position i of 1 to N, a pattern of the gradation value L of each of the left boundary portion threshold value matrix and the right boundary portion threshold value matrix is decided. Similarly, by deciding a pattern for each gradation value of 0 to a maximum gradation for the gradation value L and repeating this in accordance with a general procedure of generating the dithering matrix from a relationship between the gradation value and the dot arrangement pattern, the left boundary portion threshold value matrix and the right boundary portion threshold value matrix can be generated.

That is, the boundary portion threshold value matrix can be generated by generating a pattern of each boundary position while sequentially changing the boundary position (position i) at which the first threshold value matrix pattern, which is the dot arrangement implemented by the normal portion threshold value matrix, and the second threshold value matrix pattern, which is the dot arrangement implemented by the correction portion threshold value matrix, are combined, and combining the patterns of these plurality of boundary positions.

<<Configuration Example 1 of Image Processing Apparatus>>

Next, an example of an apparatus configuration for realizing the image processing method will be described.

Figure 17:
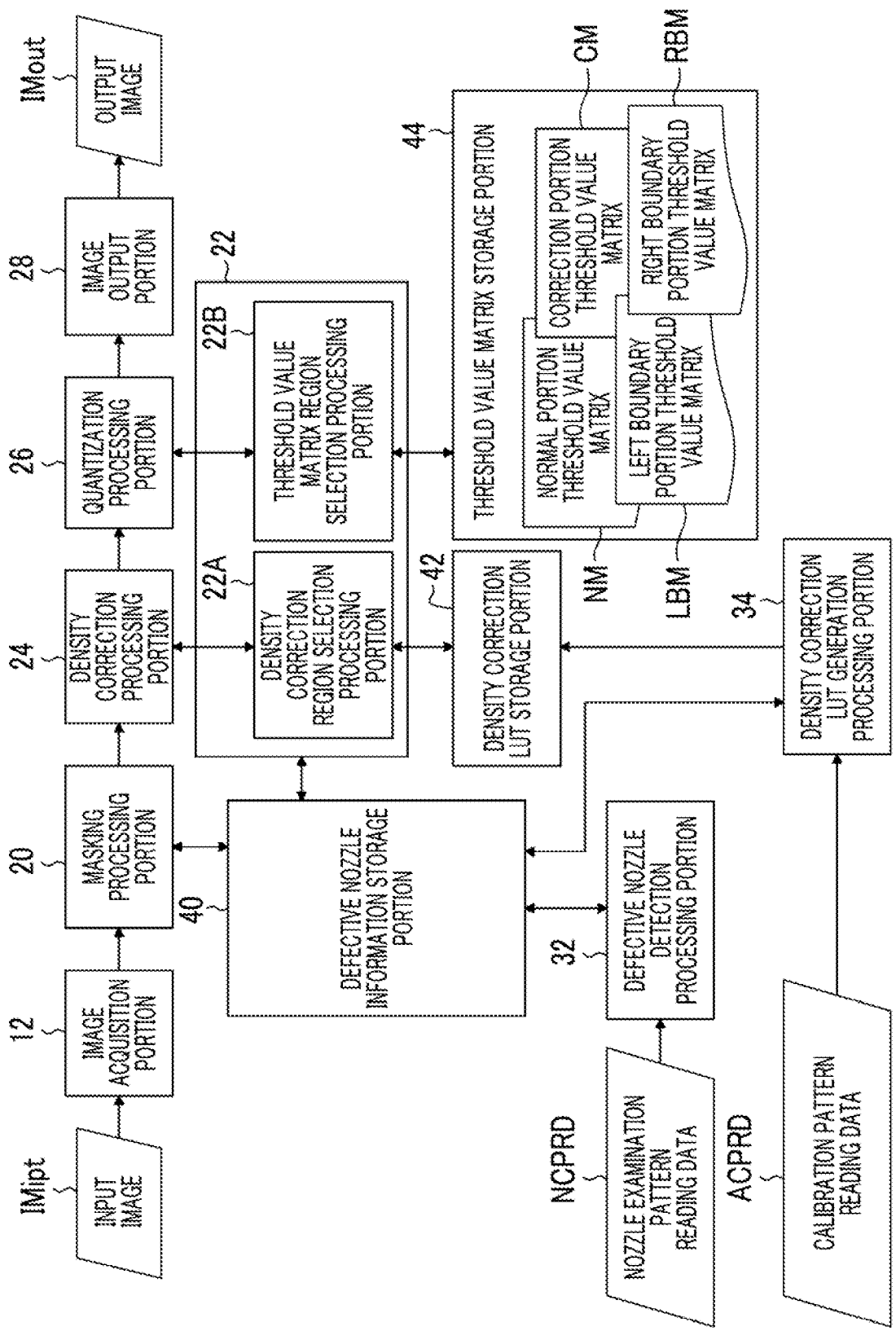
FIG. 17 is a block diagram illustrating Configuration Example 1 of an image processing apparatus according to the embodiment of the present invention.

FIG. 17 is a block diagram illustrating Configuration Example 1 of the image processing apparatus according to the embodiment of the present invention. An image processing apparatus 10 comprises an image acquisition portion 12, a masking processing portion 20, a region selection processing portion 22, a density correction processing portion 24, a quantization processing portion 26, and an image output portion 28.

The region selection processing portion 22 includes a density correction region selection processing portion 22A and a threshold value matrix region selection processing portion 22B.

In addition, the image processing apparatus 10 comprises a defective nozzle detection processing portion 32, a density correction LUT generation processing portion 34, a defective nozzle information storage portion 40, a density correction LUT storage portion 42, and a threshold value matrix storage portion 44.

The image acquisition portion 12 is an input interface for fetching the data of the input image IMipt. The image acquisition portion 12 can be configured with a data input terminal that fetches image data from another signal processing portion outside or inside the apparatus. In addition, in the image acquisition portion 12, a wired or wireless communication interface portion may be employed, a media interface portion that performs reading and writing on a portable-type external storage medium such as a memory card may be employed, or an appropriate combination of these aspects may be used.

It is assumed that the input image IMipt here is a gradation image of each color having the same types and number of colors and a resolution as ink colors used by the ink jet printing apparatus. For example, in a case of an ink jet printing apparatus implementing an output resolution of 1200 dpi using ink of four colors of CMYK of cyan (C), magenta (M), yellow (Y), and black (K), the input image IMipt may be continuous gradation image data of 8 bits (256 gradations) for each color of CMYK. Here, "dot per inch (dpi)" is a unit representation representing the number of dots per inch. One inch is 25.4 millimeters [mm].

Various formats of the data of the input image IMipt may be present. In a case of handling image data specified by a format of a combination of colors and a resolution different from the types of ink colors and the resolution used by the ink jet printing apparatus, the image data is transformed into image data of the ink colors and the resolution used by the ink jet printing apparatus by performing processing such as color transformation and/or resolution transformation or the like by a preprocessing portion, not illustrated. The image data input from the image acquisition portion 12 may be configured to be input into the preprocessing portion, or image data processed by the preprocessing portion may be configured to be input from the image acquisition portion 12.

As an example, in a case where original image data is image data of RGB represented by components of red (R), green (G), and blue (G), the RGB image data can be transformed into CMYK data (input image) appropriate for the ink jet printing apparatus by performing color transformation processing and/or resolution transformation processing from RGB into CMYK by a raster image processor (RIP) apparatus or the like corresponding to the preprocessing portion and then, input into the image acquisition portion 12.

The masking processing portion 20 performs the masking processing on the defective nozzle based on the defective nozzle information stored in the defective nozzle information storage portion 40. The defective nozzle information is fetched from the defective nozzle detection processing portion 32 and stored in the defective nozzle information storage portion 40.

The defective nozzle detection processing portion 32 performs processing of detecting the defective nozzle based on nozzle examination pattern reading data NCPRD obtained from a printing result of the nozzle examination pattern. The defective nozzle detection processing portion 32 may include an image reading device such as a scanner or a camera reading out the printing result of the nozzle examination pattern.

The region selection processing portion 22 performs processing of selecting the density correction LUT and the threshold value matrix to be referred to in accordance with the position of the pixel based on the defective nozzle information stored in the defective nozzle information storage portion 40. The density correction region selection processing portion 22A switches the density correction LUT in accordance with the position of the pixel of the processing target. The threshold value matrix region selection processing portion 22B switches the threshold value matrix in accordance with the position of the pixel of the processing target.

The density correction processing portion 24 performs processing of correcting the image signal value of the pixel by referring to the density correction LUT designated by the region selection processing portion 22. The density correction LUT is generated by the density correction LUT generation processing portion 34 and stored in the density correction LUT storage portion 42. The density correction processing in the density correction processing portion 24 includes correction processing of reducing visibility of an image defect of the defective nozzle.

The density correction LUT generation processing portion 34 generates the density correction LUT by obtaining the gamma characteristics for each nozzle based on calibration pattern reading data ACPRD obtained from a printing result of a calibration pattern for measuring output density for each nozzle.

The image data after density correction corrected by the density correction processing portion 24 is transmitted to the quantization processing portion 26 and subjected to the quantization by the quantization processing portion 26 by applying different threshold value matrices for each region of the normal portion, the correction portion, and the boundary portion.

The threshold value matrix storage portion 44 stores a plurality of types of threshold value matrices to be applied to each region of the normal portion, the correction portion, and the boundary portion. For example, the threshold value matrix storage portion 44 stores the normal portion threshold value matrix NM, the correction portion threshold value matrix CM, the left boundary portion threshold value matrix LBM, and the right boundary portion threshold value matrix RBM. These threshold value matrices can be generated using an information processing apparatus (for example, a personal computer) separated from the image processing apparatus 10.

The quantization processing portion 26 performs the quantization by referring to a corresponding threshold value matrix value of the threshold value matrix selected by the threshold value matrix region selection processing portion 22B.

Data of a dot image generated by the quantization processing portion 26 is output from the image output portion 28. The image output portion 28 can be configured with a data output terminal that outputs data of the output image IMout to the other signal processing portion outside or inside the apparatus. In addition, in the image output portion 28, a wired or wireless communication interface may be employed, a media interface portion that performs reading and writing on a portable-type external storage medium such as a memory card may be employed, or an appropriate combination of these aspects may be used.

The defective nozzle detection processing portion 32 in FIG. 17 is an example of a "recording element information acquisition portion" and a "defective recording element detection processing portion" according to the present disclosure. In addition, an example of the "recording element information acquisition portion" according to the present disclosure includes a configuration of fetching the defective nozzle information from the defective nozzle information storage portion 40 by each of the masking processing portion 20 and the region selection processing portion 22. The density correction processing portion 24 is an example of a "correction processing portion" according to the present disclosure. The density correction LUT is an example of a "density correction table" according to the present disclosure. The density correction LUT generation processing portion 34 is an example of a "density correction table generation processing portion" according to the present disclosure.

<<Configuration Example 2 of Image Processing Apparatus>>

Figure 18:
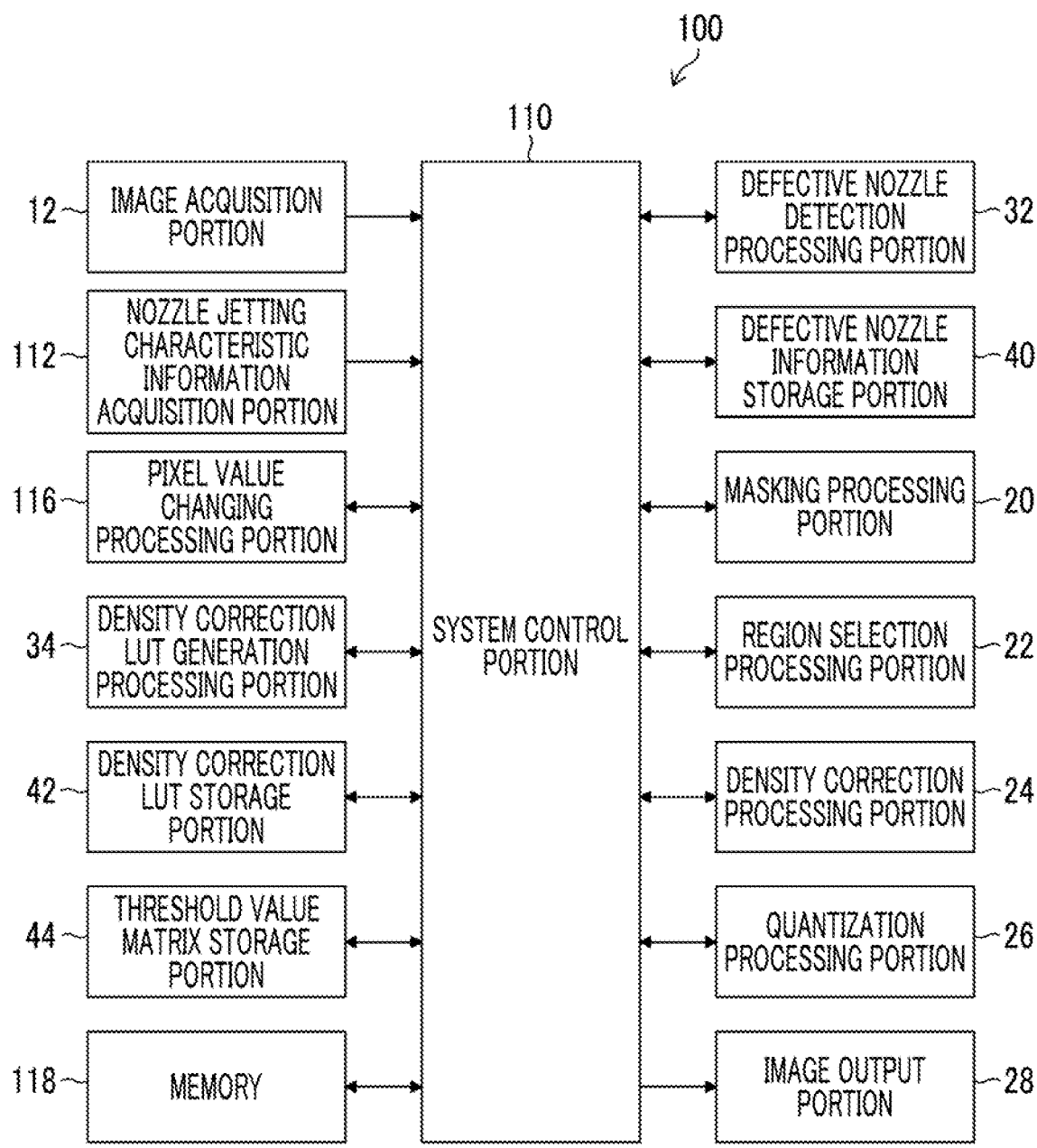
FIG. 18 is a block diagram illustrating Configuration Example 2 of the image processing apparatus.

FIG. 18 is a block diagram illustrating Configuration Example 2 of the image processing apparatus. An image processing apparatus 100 illustrated in FIG. 18 can be applied to an image processing portion that transforms input image data into dot data in the ink jet printing apparatus. In FIG. 18, the same or similar elements to FIG. 17 are designated by the same reference signs, and descriptions of such elements will be omitted.

The image processing apparatus 100 comprises, in addition to the configuration described using FIG. 17, a system control portion 110, a nozzle jetting characteristic information acquisition portion 112, a pixel value changing processing portion 116, and a memory 118.

The system control portion 110 controls the entire ink jet printing apparatus. The nozzle jetting characteristic information acquisition portion 112 acquires jetting characteristic information for each nozzle. For example, the jetting characteristic information includes at least one of output density characteristics, the landing position error, the droplet amount, or information indicating whether or not non-jetting occurs, with respect to a jetting instruction signal. The jetting characteristic information may include the defective nozzle information. The nozzle jetting characteristic information acquisition portion 112 may include an image reading device that reads out the printing result of the nozzle examination pattern and/or the calibration pattern. In addition, the nozzle jetting characteristic information acquisition portion 112 may be configured with a data input interface for fetching the jetting characteristic information specified from the printing result of the nozzle examination pattern and/or the calibration pattern as data.

The pixel value changing processing portion 116 changes the image signal value of the pixel corresponding to the correction nozzle near the masked defective nozzle based on the defective nozzle information. As described above, the pixel value changing processing portion 116 may be incorporated in the density correction processing portion 24.

The memory 118 is used as a primary storage region of data and an operation region of each portion. Here, "operation" is an aspect of "processing", and the term "processing" includes a concept of "operation". The image processing apparatus 100 may comprise, in addition to the configuration illustrated in FIG. 18, a parameter storage portion, not illustrated, that stores various parameters and/or a transformation table or the like used for processing of each portion of the apparatus, and a program storage portion that stores a program used for processing of each portion of the apparatus.

The nozzle jetting characteristic information acquisition portion 112 in FIG. 18 is an example of a "recording element information acquisition portion" according to the present disclosure. The pixel value changing processing portion 116 and the density correction processing portion 24 are an example of the "correction processing portion" according to the present disclosure.

<<Configuration Example of Image Forming Apparatus>>

Figure 19:
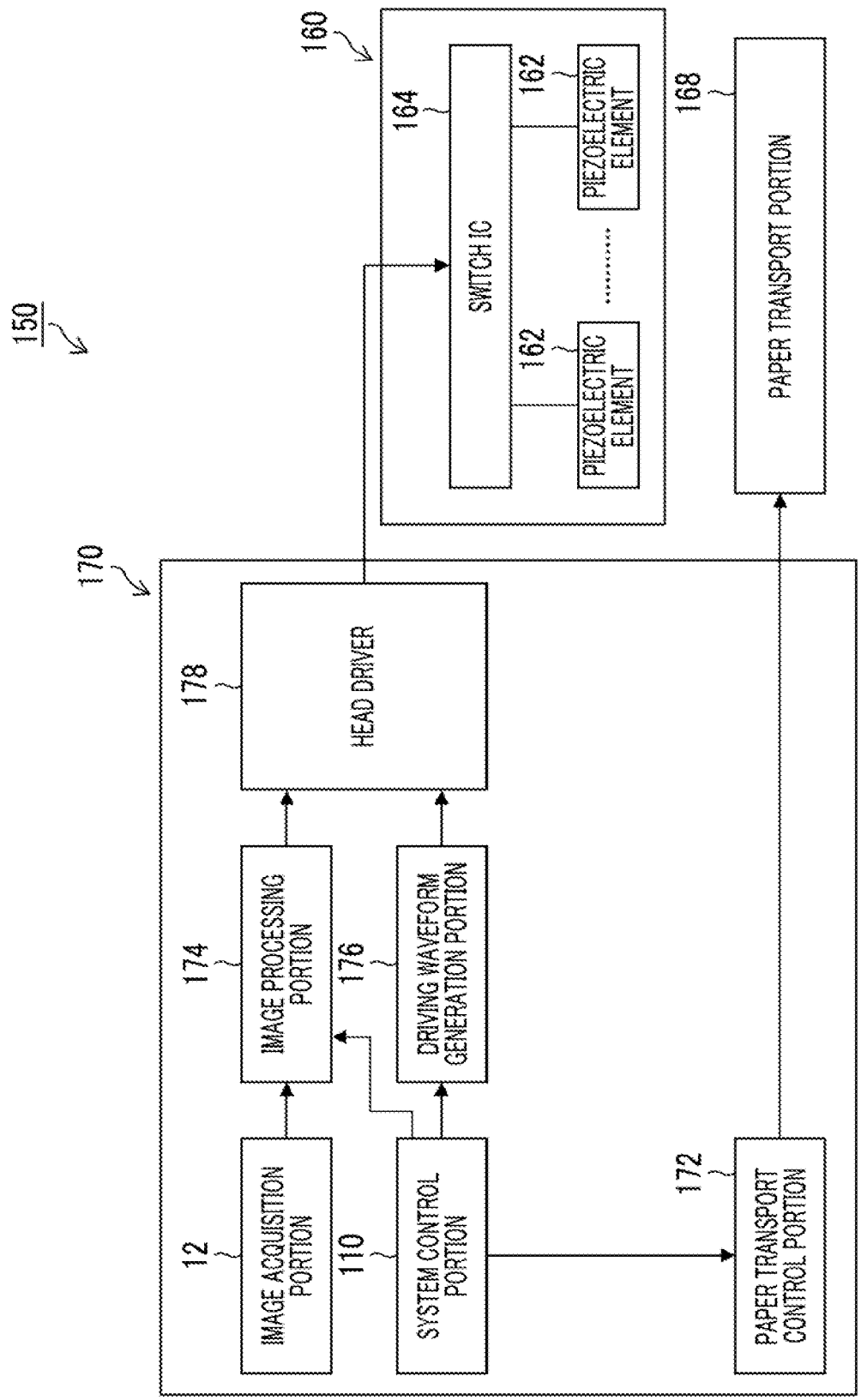
FIG. 19 is a block diagram illustrating a main configuration of an image forming apparatus according to the embodiment of the present invention.

FIG. 19 is a block diagram illustrating a main configuration of an image forming apparatus according to the embodiment of the present invention. An image forming apparatus 150 is an ink jet printing apparatus of a single pass method and is configured to include a recording head 160, a paper transport portion 168, and a control device 170. Here, while the recording head 160 of one color is illustrated for simplification of illustration, the image forming apparatus 150 comprises a plurality of recording heads corresponding to each color of a plurality of ink colors. In FIG. 19, the same or similar elements to the configurations illustrated in FIG. 17 and FIG. 18 are designated by the same reference signs, and descriptions of such elements will be omitted.

The recording head 160 illustrated in FIG. 19 is a line-type ink jet head including a plurality of nozzles and comprises a plurality of piezoelectric elements 162 as jetting energy generation elements that generate jetting energy necessary for ink jetting in correspondence with each nozzle, and a switch integrated circuit (IC) 164 that switches between driving or non-driving of each piezoelectric element 162.

The number of nozzles, nozzle density, and an arrangement form of the nozzles in the recording head 160 are not particularly limited, and various forms are available. For example, the recording head 160 may be configured such that multiple nozzles are two-dimensionally arranged in order to be capable of implementing a predetermined recording resolution in the X direction. Nozzle arrangement of a plurality of two-dimensionally arranged nozzles will be referred to as "two-dimensional nozzle arrangement".

In a case of an ink jet head having the two-dimensional nozzle arrangement, a projection nozzle column in which each nozzle in the two-dimensional nozzle arrangement is projected (orthographically projected) such that nozzles are arranged in the X direction (paper width direction) can be considered to be equivalent to a nozzle column of one column in which nozzles are arranged at approximately equal intervals with nozzle density accomplishing the predetermined recording resolution in the paper width direction. Here, the "equal intervals" mean substantially equal intervals as droplet hit points recordable by the ink jet printing apparatus. For example, a concept of the "equal intervals" includes a case including slight variations in interval considering movement of liquid droplets on the paper due to a manufacturing error or landing interference. Considering the projection nozzle column (referred to as a "substantial nozzle column"), a nozzle position (nozzle number) can be associated in an arrangement order of projection nozzles arranged in the X direction. The "nozzle position" refers to a position of a nozzle in the substantial nozzle column.

The control device 170 controls a recording operation performed by the recording head 160 and a paper transport operation performed by the paper transport portion 168. The control device 170 comprises the image acquisition portion 12, the system control portion 110, a paper transport control portion 172, an image processing portion 174, a driving waveform generation portion 176, and a head driver 178.

The paper transport control portion 172 controls the paper transport portion 168 in accordance with an instruction from the system control portion 110. Accordingly, the paper, not illustrated, is transported to the recording head 160.

The image processing portion 174 has processing functions of the masking processing portion 20, the region selection processing portion 22, the density correction processing portion 24, and the quantization processing portion 26 described using FIG. 17 and FIG. 18. The image processing portion 174 may have processing functions of the defective nozzle detection processing portion 32 and the density correction LUT generation processing portion 34. That is, functions of the image processing apparatus 10 described using FIG. 17 are implemented by a combination of the image acquisition portion 12, the system control portion 110, and the image processing portion 174 in FIG. 19.

The image processing portion 174 transforms input image data into dot data of two values or multiple values. The dot data is the data of the dot image representing the dot arrangement pattern. A content of the quantization processing is the same as described above. The quantization processing generally transforms gradation image data of m values into gradation image data of n values. Here, m is an integer greater than or equal to three, and n is an integer greater than or equal to two and less than m. While transformation into the dot data of two values (ON/OFF of dots) is the simplest example, quantization into multiple values corresponding to types of dot sizes can be performed in the quantization processing.

The dot data of two values or multiple values generated by the image processing portion 174 is used as ink jetting control data for controlling driving (ON) or non-driving (OFF) of each nozzle and furthermore, a liquid droplet amount (dot size) in a case of multiple values. The dot data generated by the image processing portion 174 is provided to the head driver 178, and an ink jetting operation of the recording head 160 is controlled.

The driving waveform generation portion 176 is a circuit that generates a driving voltage signal waveform for driving the piezoelectric elements 162 corresponding to each nozzle of the recording head 160. Waveform data of a driving voltage signal is stored in advance in a storage device such as a ROM, and the waveform data to be used is output as necessary. A signal output from the driving waveform generation portion 176 may be digital waveform data or an analog voltage signal.

The driving voltage signal waveform generated by the driving waveform generation portion 176 is supplied to the head driver 178. In the image forming apparatus 150, a driving method of jetting ink from the nozzles corresponding to each piezoelectric element 162 by supplying a common driving power waveform signal to each piezoelectric element 162 of the recording head 160 through the switch IC 164 and switching between ON/OFF of a switch element connected to an individual electrode of the corresponding piezoelectric element 162 in accordance with a jetting timing of each nozzle. The recording head 160 jets ink liquid droplets on demand in accordance with a driving signal and a jetting control signal provided from the head driver 178.

<<Configuration Example of Ink Jet Printing Apparatus>>

Figure 20:
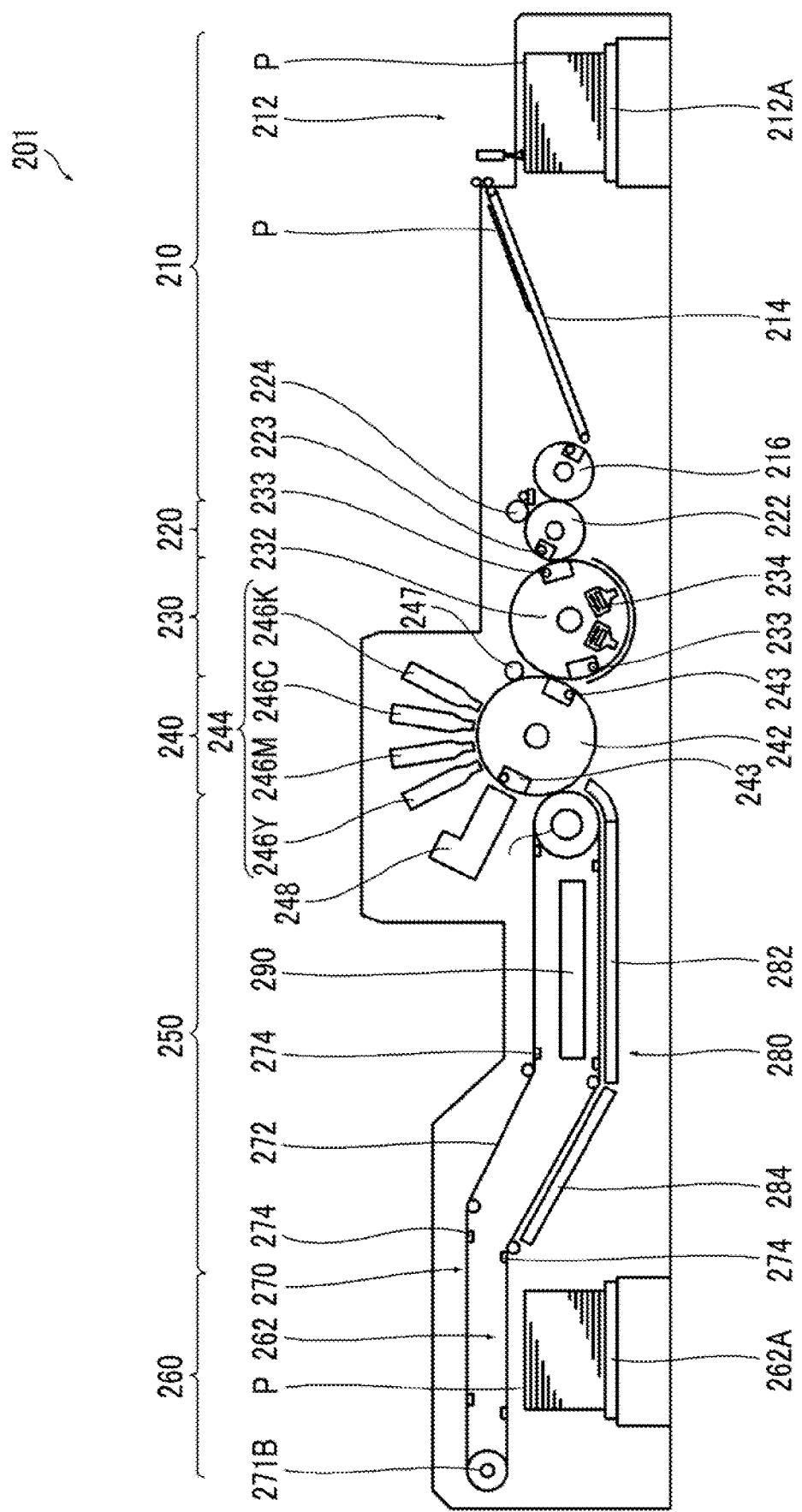
FIG. 20 is an overall configuration diagram illustrating a configuration example of an ink jet printing apparatus according to a form of the image forming apparatus.

FIG. 20 is an overall configuration diagram illustrating a configuration example of an ink jet printing apparatus 201 according to a form of the image forming apparatus 150. The ink jet printing apparatus 201 is a color digital printing apparatus that prints a desired image on cut paper P with ink of four colors of CMYK using the single pass method.

In the present example, aqueous ink is used as ink for drawing. The aqueous ink refers to ink obtained by dissolving or dispersing a coloring material such as a pigment or a dye in water and/or a water-soluble solvent. Ultraviolet ray curable-type ink may be used instead of the aqueous ink.

The ink jet printing apparatus 201 comprises a paper feeding portion 210, a treatment liquid application portion 220, a treatment liquid drying portion 230, a drawing portion 240, an ink drying portion 250, and a stacking portion 260.

The paper feeding portion 210 comprises a paper feeding device 212, a feeder board 214, and a paper feeding drum 216. The paper P is placed on a paper feeding stand 212A in a state of a pile in which multiple sheets are stacked. While a type of paper P is not particularly limited, for example, printing paper such as high-quality paper, coated paper, or art paper mainly made of cellulose can be used.

The paper feeding device 212 takes out the paper P in the state of the pile set on the paper feeding stand 212A one sheet at a time in order from the top and feeds the paper P to the feeder board 214. The feeder board 214 transports the paper P received from the paper feeding device 212 to the paper feeding drum 216.

The paper feeding drum 216 receives the paper P fed from the feeder board 214 and transports the received paper P to the treatment liquid application portion 220.

The treatment liquid application portion 220 coats the paper P with a treatment liquid. The treatment liquid is a liquid having a function of coagulating, insolubilizing, or thickening a coloring material component in the ink. The treatment liquid application portion 220 comprises a treatment liquid coating drum 222 and a treatment liquid coating device 224.

The treatment liquid coating drum 222 receives the paper P from the paper feeding drum 216 and transports the received paper P to the treatment liquid drying portion 230. The treatment liquid coating drum 222 comprises a gripper 223 on a circumferential surface and transports the paper P by winding the paper P onto the circumferential surface by rotating while gripping a tip part of the paper P by the gripper 223.

The treatment liquid coating device 224 coats the paper P transported by the treatment liquid coating drum 222 with the treatment liquid. Coating with the treatment liquid is performed by a roller. A method of coating with the treatment liquid is not limited to a roller coating method. Other methods may be applied to the treatment liquid coating device 224. Example of the other methods of the treatment liquid coating device 224 includes coating using a blade, jetting using an ink jet method, or spraying using a spraying method.

The treatment liquid drying portion 230 performs drying processing on the paper P coated with the treatment liquid. The treatment liquid drying portion 230 comprises a treatment liquid drying drum 232 and a hot air blower 234. The treatment liquid drying drum 232 receives the paper P from the treatment liquid coating drum 222 and transports the received paper P to the drawing portion 240. The treatment liquid drying drum 232 comprises a gripper 233 on a circumferential surface. The treatment liquid drying drum 232 transports the paper P by rotating while gripping the tip part of the paper P by the gripper 233.

The hot air blower 234 is installed inside the treatment liquid drying drum 232. The hot air blower 234 dries the treatment liquid by blowing hot air to the paper P transported by the treatment liquid drying drum 232.

The drawing portion 240 comprises a drawing drum 242, a head unit 244, a paper lifting detection portion 245, a paper pressing roller 247, and an image reading device 248. The drawing drum 242 receives the paper P from the treatment liquid drying drum 232 and transports the received paper P to the ink drying portion 250. The drawing drum 242 comprises a gripper 243 on a drum circumferential surface and transports the paper P by winding the paper P onto the circumferential surface by rotating while gripping a tip of the paper P using the gripper 243.

The drawing drum 242 comprises a suction adhesion mechanism, not illustrated, and transports the P wound on the circumferential surface by causing the paper P to adhere to the drum circumferential surface by suction. A negative pressure is used for suction adhesion. The drawing drum 242 comprises multiple suction adhesion holes on the circumferential surface and causes the paper P to adhere to the circumferential surface of the drawing drum 242 by suction by suctioning the paper P from an inside of the drawing drum 242 through the suction adhesion holes.

The head unit 244 is configured to include ink jet heads 246K, 246C, 246M, and 246Y.

The ink is supplied to each of the ink jet heads 246K, 246C, 246M, and 246Y through a pipe path, not illustrated, from an ink tank, not illustrated, that is an ink supply source of a corresponding color.

Each of the ink jet heads 246K, 246C, 246M, and 246Y is configured with a line-type recording head that can perform printing by scanning once for the paper P transported by the drawing drum 242, that is using the single pass method. A nozzle surface of each of the ink jet heads 246K, 246C, 246M, and 246Y is arranged to face the circumferential surface of the drawing drum 242. The ink jet heads 246K, 246C, 246M, and 246Y are arranged at constant intervals along a transport path of the paper P by the drawing drum 242.

While illustration is not provided in FIG. 20, a plurality of nozzles that are outlets of the ink are two-dimensionally arranged on the nozzle surface of each of the ink jet heads 246K, 246C, 246M, and 246Y The "nozzle surface" refers to a jetting surface on which the nozzles are formed and is synonymous with the term "ink jetting surface", "nozzle forming surface", or the like. Nozzle arrangement of a plurality of two-dimensionally arranged nozzles will be referred to as "two-dimensional nozzle arrangement". A water-repellent film is formed on the nozzle surface of each of the ink jet heads 246K, 246C, 246M, and 246Y.

Each of the ink jet heads 246K, 246C, 246M, and 246Y can be configured by connecting a plurality of head modules in the paper width direction. Each of the ink jet heads 246K, 246C, 246M, and 246Y is a line-type recording head including a nozzle column that can perform image recording on the entire recording region of the paper P with a prescribed recording resolution by scanning once in the paper width direction. Such a recording head is also called a "full line-type recording head" or a "pagewide head". In the present specification, the prescribed recording resolution may be a recording resolution predetermined by the ink jet printing apparatus 201 or a recording resolution set by selection by a user or automatic selection corresponding to a printing mode by a program. For example, the recording resolution can be 1200 dpi.

Liquid droplets of the ink are jetted from at least one head of the ink jet head 246K, 246C, 246M, or 246Y toward the paper P transported by the drawing drum 242, and an image is formed on the paper P by adhesion of the jetted liquid droplets to the paper P.

The drawing drum 242 functions as means for relatively moving the ink jet heads 246K, 246C, 246M, and 246Y and the paper P. The drawing drum 242 is an example of a paper transport portion that transports the paper P with respect to the ink jet heads 246K, 246C, 246M, and 246Y A jetting timing of each of the ink jet heads 246K, 246C, 246M, and 246Y is synchronized with an encoder signal obtained from an encoder installed in the drawing drum 242. The encoder is not illustrated in FIG. 20 and is denoted by a reference numeral 382 in FIG. 22. The jetting timing is a timing at which the liquid droplets of the ink are jetted, and is synonymous with a droplet hit timing.

While a configuration of using the ink of four colors of CMYK is illustrated in the present example, a combination of the ink colors and the number of colors is not limited to the present embodiment. Light ink, dark ink, special color ink, and the like may be added as necessary. For example, a configuration of adding an ink jet head jetting light-based ink such as light cyan or light magenta, or a configuration of adding an ink jet head jetting ink of a special color such as a green color or an orange color is also available. In addition, an arrangement order of the ink jet heads of each color is not particularly limited. A nozzle to be used for a droplet hit is selected for each pixel in accordance with a nozzle distribution masking pattern file for each color of the ink.

The image reading device 248 is a device that optically reads out the image recorded on the paper P by the ink jet heads 246K, 246C, 246M, and 246Y and generates electronic image data indicating the read image. The image reading device 248 includes an imaging device that captures the image recorded on the paper P and transforms the image into an electric signal indicating image information. In addition to the imaging device, the image reading device 248 may include an illumination optical system that illuminates a reading target, and a signal processing circuit that generates digital image data by processing a signal obtained from the imaging device.

It is preferable that the image reading device 248 is configured to be capable of reading out a color image. In the image reading device 248 of the present example, for example, a color charge-coupled device (CCD) linear image sensor is used as the imaging device. The color CCD linear image sensor is an image sensor in which light-receiving elements comprising color filters of each color of RGB are linearly arranged. A color complementary metal oxide semiconductor (CMOS) linear image sensor can be used instead of the color CCD linear image sensor.

The image reading device 248 reads out the image on the paper P during transport of the paper P by the drawing drum 242. Such an image reading device installed on a paper transport path may be called an "inline scanner" or an "inline sensor". In addition, the image reading device 248 may be a camera.

The image on the paper P is read out in a case where the paper P on which the image is recorded using at least one of the ink jet head 246K, 246C, 246M, or 246Y passes through a reading region of the image reading device 248. The image recorded on the paper P may include not only a user image of a printing target designated by a job but also the nozzle examination pattern for examining a jetting state for each nozzle, the calibration pattern for printing density correction, and other various test patterns.

Information on a density of the image, a jetting defect of the ink jet heads 246K, 246C, 246M, and 246Y, and the like is obtained based on data of the read image read out by the image reading device 248. In addition, a printed image is examined, and presence or absence of abnormal image quality is determined based on the data of the read image read out by the image reading device 248.

The ink drying portion 250 performs the drying processing on the paper P on which the image is formed by the drawing portion 240. The ink drying portion 250 comprises a chain gripper 270, a paper guide 280, and a heated drying processing portion 290.

The chain gripper 270 receives the paper P from the drawing drum 242 and transports the received paper P to the stacking portion 260. The chain gripper 270 comprises a pair of endless chains 272 traveling on a prescribed traveling path and transports the paper P along a prescribed transport path in a state where the tip part of the paper P is gripped by a gripper 274 comprised in the pair of chains 272. A plurality of grippers 274 are comprised in the chains 272 at constant intervals.

The chain gripper 270 is configured to include a first sprocket 271A, a second sprocket 271B, the chains 272, and the plurality of grippers 274 and has a structure in which the pair of endless chains 272 is wound around a pair of the first sprocket 271A and the second sprocket 271B.

The chain gripper 270 has a structure in which the plurality of grippers 274 are arranged at a plurality of positions in a forwarding direction of the chains 272. In addition, the chain gripper 270 has a structure in which the plurality of grippers 274 are arranged in the paper width direction between the pair of chains 272.

The transport path of the paper P by the chain gripper 270 includes a horizontal transport region in which the paper P is transported in a horizontal direction, and an inclined transport region in which the paper P is transported in an oblique upward direction from an end of the horizontal transport region. The horizontal transport region will be referred to as a first transport zone, and the inclined transport region will be referred to as a second transport zone.

The paper guide 280 is a mechanism that guides transport of the paper P by the chain gripper 270. The paper guide 280 is configured to include a first paper guide 282 and a second paper guide 284. The first paper guide 282 guides the paper P transported through the first transport zone of the chain gripper 270. The second paper guide 284 guides the paper transported through the second transport zone of a rear stage of the first transport zone.

A suction adhesion belt transport device is used as the first paper guide 282. The suction adhesion belt transport device is a device that transports the paper P by forwarding a transport belt in a state where the paper P is caused to adhere to the endless transport belt by suction.

The heated drying processing portion 290 dries the paper P by evaporating the solvent of the ink by heating the paper P on which the image is formed by the drawing portion 240. For example, the heated drying processing portion 290 is a hot air blowing unit, and is arranged to face the first paper guide 282 and blows hot air to the paper P transported by the chain gripper 270.

The stacking portion 260 comprises a stacking device 262 that receives and stacks the paper P transported from the ink drying portion 250 by the chain gripper 270. The chain gripper 270 releases the paper P at a predetermined stacking position. The stacking device 262 comprises a stacking tray 262A and receives the paper P released from the chain gripper 270 and stacks the paper P into a pile on the stacking tray 262A. The stacking portion 260 corresponds to a paper discharging portion.

In addition, while illustration is not provided in FIG. 20, the ink jet printing apparatus 201 comprises a maintenance portion that performs maintenance processing on the ink jet heads 246K, 246C, 246M, and 246Y The maintenance portion is installed alongside the drawing drum 242 in an axial direction of the drawing drum 242.

<<Summary of System Configuration of Ink Jet Printing Apparatus 201>>

Figure 21:
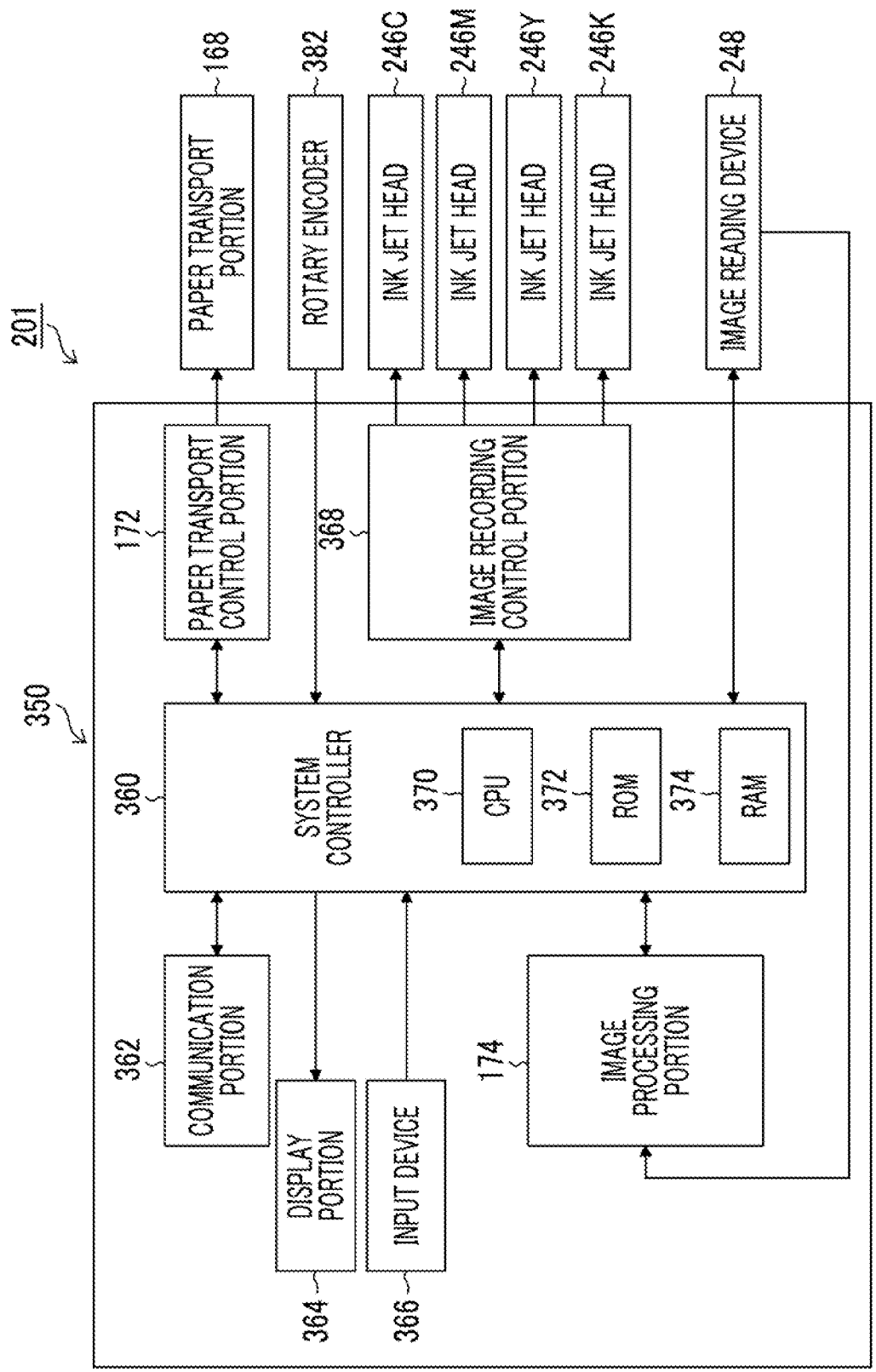
FIG. 21 is a block diagram illustrating a main configuration of a control system of the ink jet printing apparatus.

FIG. 21 is a block diagram illustrating a main configuration of a control system of the ink jet printing apparatus 201. The ink jet printing apparatus 201 is controlled by a control device 350. The control device 350 comprises a system controller 360, a communication portion 362, a display portion 364, an input device 366, the image processing portion 174, the paper transport control portion 172, and an image recording control portion 368. Elements of each portion in the control device 350 can be implemented by one or a plurality of computers.

The system controller 360 functions as control means for controlling each portion of the ink jet printing apparatus 201, and functions as operation means for performing various types of operation processing. The system controller 360 comprises a central processing unit (CPU) 370, a read-only memory (ROM) 372, and a random access memory (RAM) 374 and operates in accordance with a predetermined program. The ROM 372 stores a program executed by the system controller 360 and various types of data necessary for control.

The communication portion 362 comprises a required communication interface. The ink jet printing apparatus 201 is connected to a host computer, not illustrated, through the communication portion 362 and can transmit and receive data to and from the host computer. Here, "connection" includes wired connection, wireless connection, or a combination thereof. A buffer memory for high-speed communication may be mounted in the communication portion 362.

The communication portion 362 has a role as an image input interface for acquiring image data representing an image of the printing target.

A user interface is configured with the display portion 364 and the input device 366. The display portion 364 is an output interface on which various types of information are displayed. For example, the display portion 364 may be a liquid crystal display, an organic electro-luminescence (EL) (OEL) display, or a projector, or an appropriate combination thereof. In the input device 366, various input devices such as a keyboard, a mouse, a touch panel, and a trackball can be employed, and an appropriate combination thereof may also be used. A form of configuring the display portion 364 and the input device 366 in an integrated manner as in a configuration of arranging the touch panel on a screen of the display portion 364 is also available.

An operator can perform input of various types of information such as input of a printing condition, selection of an image quality mode, input of other setting items, input and editing of subsidiary information, and search for information using the input device 366 while viewing a content displayed on the screen of the display portion 364. In addition, the operator can check an input content and other various types of information through display of the display portion 364.

The image processing portion 174 performs various types of transformation processing, the density correction processing, and the quantization processing (halftone processing) on image data of the printing target. The transformation processing includes transformation of the number of pixels, gradation transformation, color transformation, and the like.

The image processing portion 174 has an image processing function of the image processing apparatus described using FIG. 17 and FIG. 18.

The image processing portion 174 may be configured with a computer separated from the control device including the system controller 360 or may be configured to be encompassed as a function block in the control device including the system controller 360.

The paper transport portion 168 includes a paper transport mechanism related to transport of the paper P from the paper feeding portion 210 to the stacking portion 260 illustrated in FIG. 20. The paper transport portion 168 includes the paper feeding drum 216, the treatment liquid coating drum 222, the treatment liquid drying drum 232, the drawing drum 242, the chain gripper 270, and the like illustrated in FIG. 20. In addition, the paper transport portion 168 includes a driving portion such as a motor as a motive power source, not illustrated, and a motor driving circuit.

The paper transport control portion 172 controls the paper transport portion 168 and controls the paper P to be transported without a delay from the paper feeding portion 210 to the stacking portion 260 in accordance with an instruction from the system controller 360.

The ink jet printing apparatus 201 comprises a rotary encoder 382 as means for detecting a rotation angle of the drawing drum 242 (refer to FIG. 20) in the paper transport portion 168. The jetting timing of each of the ink jet heads 246C, 246M, 246Y, and 246K is controlled in accordance with a jetting timing signal generated from a rotary encoder signal output by the rotary encoder 382.

The image recording control portion 368 controls driving of each of the ink jet heads 246C, 246M, 246Y, and 246K in accordance with an instruction from the system controller 360. The image recording control portion 368 controls a jetting operation of each of the ink jet heads 246C, 246M, 246Y, and 246K based on the dot data of each ink color generated through the halftone processing of the image processing portion 174, such that a predetermined image is recorded on the paper P transported by the drawing drum 242.

<<Configuration Example of Ink Jet Head>>

Next, a configuration example of the ink jet heads 246C, 246M, 246Y, and 246K will be described. The same configuration can be employed in the ink jet heads 246C, 246M, 246Y, and 246K of each color. Thus, the ink jet heads 246C, 246M, 246Y, and 246K will be representatively described as an ink jet head 300.

Figure 22:
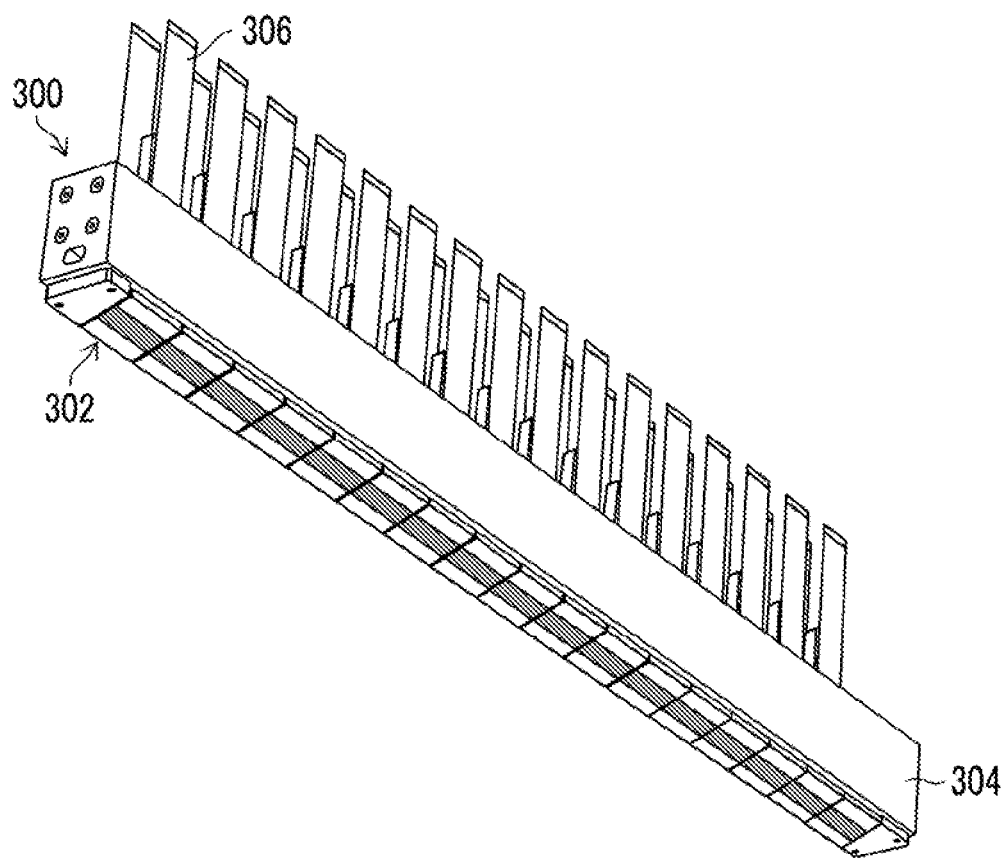
FIG. 22 is a perspective view illustrating a configuration example of an ink jet head.

FIG. 22 is a perspective view illustrating a configuration example of the ink jet head 300. In FIG. 22, a state of viewing the nozzle surface from an oblique downward direction of the ink jet head 300 is illustrated. The ink jet head 300 is a full line-type recording head that is lengthened by connecting a plurality of head modules 302. A bar-shaped ink jet head as illustrated in FIG. 22 may be called an ink jet head bar.

While an example of configuring the ink jet head bar by connecting 17 head modules 302 is illustrated in FIG. 22, a structure of the head modules 302 and the number and an arrangement form of the head modules 302 are not limited to the illustrated example. A reference numeral 304 in the drawing denotes a base frame that is a frame for connecting and fixing the plurality of head modules 302 in a bar shape. A reference numeral 306 denotes a flexible substrate connected to each head module 302.

Figure 23:
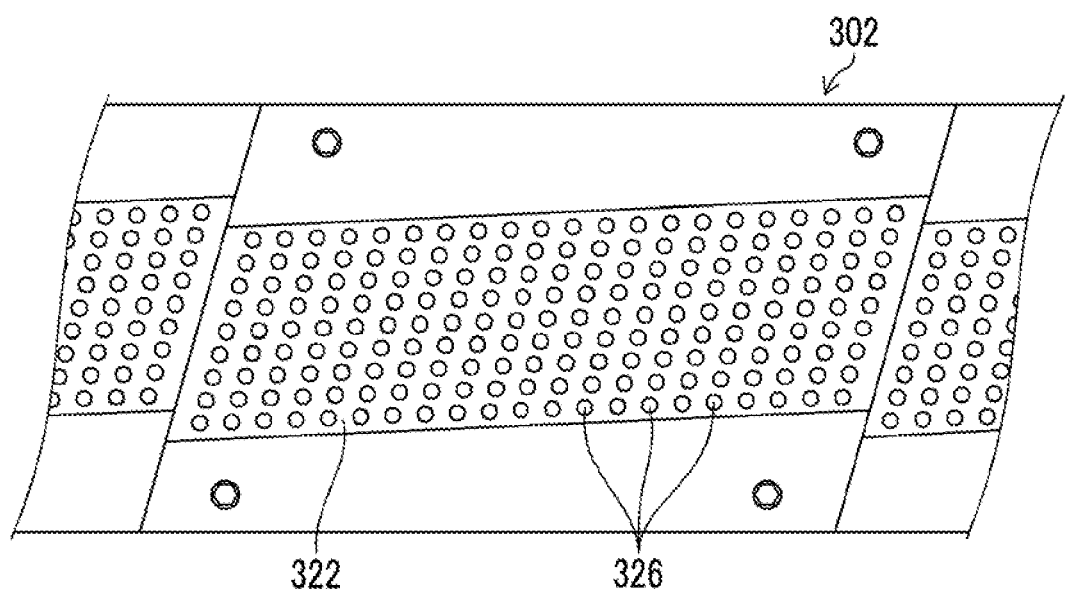
FIG. 23 is a plan view of a head module seen from a nozzle surface side.

FIG. 23 is a plan view of the head module 302 seen from a nozzle surface 322 side. While the number of nozzles drawn in FIG. 23 is reduced for convenience of illustration, for example, 32Δ64 nozzles 326 are two-dimensionally arranged on the nozzle surface 322 of one head module 302. Each head module 302 may be configured to be replaceable.

Figure 24:
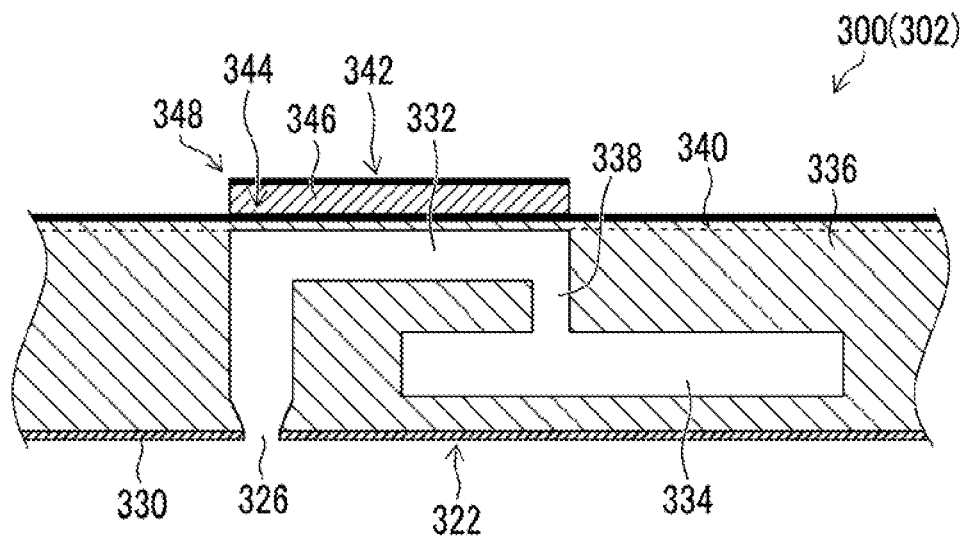
FIG. 24 is a cross-sectional view schematically illustrating an example of an internal structure of the ink jet head.

FIG. 24 is a cross-sectional view schematically illustrating an example of an internal structure of the ink jet head 300. A structure of an ejector of one nozzle in the head module 302 is illustrated in FIG. 24. As illustrated in FIG. 24, the ink jet head 300 has a structure in which a nozzle plate 330 in which the nozzles 326 are formed, a flow channel plate 336 in which pressure chambers 332 and a flow channel such as a common flow channel 334 are formed, and the like are joined by lamination. A plurality of nozzles 326 respectively communicating with the pressure chambers 332 are formed in the nozzle plate 330.

The flow channel plate 336 is a flow channel forming member that constitutes a side wall portion of the pressure chambers 332 and forms supply ports 338 as stop portions of individual supply paths guiding the ink from the common flow channel 334 to the pressure chambers 332. While illustration is simplified in FIG. 24, the flow channel plate 336 has a structure in which one or a plurality of substrates are laminated.

For example, the nozzle plate 330 and the flow channel plate 336 can be processed into a required shape by a semiconductor manufacturing process using silicon as a material.

The common flow channel 334 communicates with the ink tank (not illustrated) of the ink supply source, and the ink supplied from the ink tank is supplied to each pressure chamber 332 through the common flow channel 334.

A vibration plate 340 constituting a part (ceiling surface in FIG. 24) of surfaces of the pressure chambers 332 includes a conductive layer that functions as a common electrode corresponding to a lower electrode 344 of a piezoelectric element 348. A material of the vibration plate 340 is not limited to silicon, and an aspect of forming the vibration plate 340 with a non-conductive material such as resin is also available. The vibration plate 340 itself may be configured as a vibration plate that doubles as a common electrode, by configuring the vibration plate 340 using a metal material such as stainless steel. The piezoelectric element 348 having a structure in which a piezoelectric body 346 is interposed between individual electrodes 342 and the lower electrode 344 is joined to the vibration plate 340.

Volumes of the pressure chambers 332 change due to deformation of the piezoelectric element 348 by applying a driving voltage to the individual electrodes 342, and an accompanying pressure change causes the ink to be jetted from the nozzles 326. In a case where the piezoelectric element 348 returns to an original state after the ink is jetted, the pressure chambers 332 are refilled with new ink from the common flow channel 334 through the supply ports 338. The piezoelectric element 348 corresponds to the piezoelectric element 162 in FIG. 19.

<<Example of Apparatus Configuration for Recording Same Pixel Column Using Plurality of Nozzles>>

Figure 25:
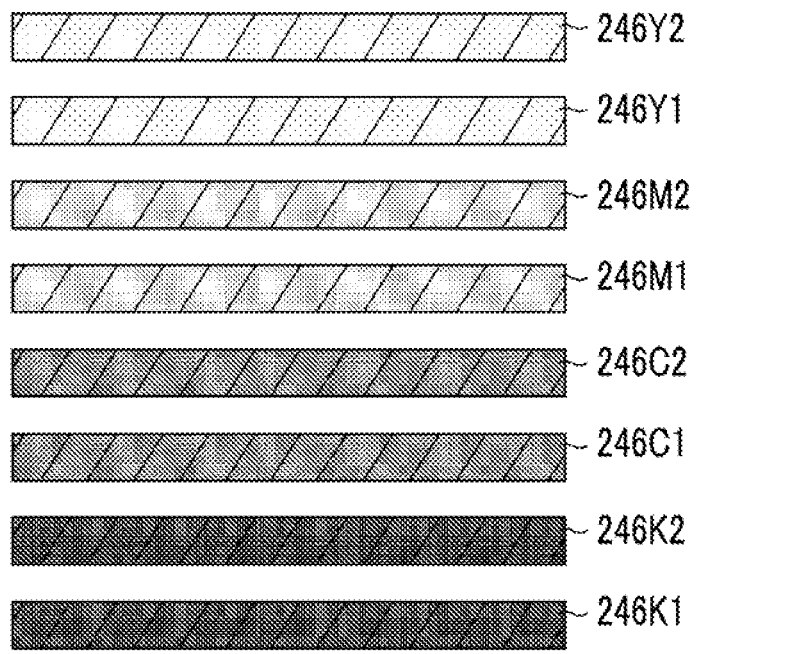
FIG. 25 is a plan view illustrating an example of an arrangement form of printheads in an image forming apparatus comprising two printheads that jet the same color ink for each color of ink.

FIG. 25 is a plan view illustrating an example of an arrangement form of recording heads in an image forming apparatus comprising two recording heads that jet the same color ink for each color of the ink. For example, in the ink jet printing apparatus using the ink of four colors of CMYK, it is possible to configure that two printheads are comprised for each color by printheads 246K1 and 246K2, 246C1 and 246C2, 246M1 and 246M2, and 246Y1 and 246Y2 as illustrated in FIG. 25. Each head can have a common structure.

The number of colors (number of color types) of the ink and an arrangement order of the printheads are not particularly limited. The nozzle to be used for the droplet hit is selected for each pixel in accordance with the nozzle distribution masking pattern file for each color of the ink. According to such a configuration, the same pixel column can be recorded by two nozzles as described using FIG. 9 to FIG. 11.

<<Hardware Configuration of Each Processing Portion and Control Portion>>

A hardware structure of a processing portion executing various types of processing of the image acquisition portion 12, the masking processing portion 20, the region selection processing portion 22, the density correction region selection processing portion 22A, the threshold value matrix region selection processing portion 22B, the density correction processing portion 24, the quantization processing portion 26, the image output portion 28, the defective nozzle detection processing portion 32, the density correction LUT generation processing portion 34, the defective nozzle information storage portion 40, the density correction LUT storage portion 42, the threshold value matrix storage portion 44, the system control portion 110, the nozzle jetting characteristic information acquisition portion 112, the pixel value changing processing portion 116, the paper transport control portion 172, and the image processing portion 174 described using FIG. 17 to FIG. 19 and the communication portion 362, the image recording control portion 368, and the like described using FIG. 21 includes various processors illustrated below.

The various processors include a CPU that is a general-purpose processor functioning as various processing portions by executing a program, a graphics processing unit (GPU) that is a processor specialized in image processing, a programmable logic device (PLD) such as an FPGA that is a processor having a circuit configuration changeable after manufacturing, and a dedicated electric circuit or the like such as an ASIC that is a processor having a circuit configuration dedicatedly designed to execute a specific type of processing.

One processing portion may be configured with one of the various processors or may be configured with two or more processors of the same type or different types. For example, one processing portion may be configured with a plurality of FPGAs, a combination of a CPU and an FPGA, or a combination of a CPU and a GPU. In addition, a plurality of processing portions may be configured with one processor. As an example of configuring the plurality of processing portions with one processor, first, as represented by a computer such as a client or a server, a form of configuring one processor with a combination of one or more CPUs and software and causing the processor to function as the plurality of processing portions is available. Second, as represented by a system on chip (SoC) or the like, a form of using a processor that implements functions of the entire system including the plurality of processing portions using one integrated circuit (IC) chip is available. Accordingly, various processing portions are configured using one or more of the various processors as the hardware structure.

Furthermore, the hardware structure of those various processors is more specifically an electric circuit (circuitry) in which circuit elements such as semiconductor elements are combined.

<<Advantage of Embodiment>>

According to the embodiment of the present invention, the artifact in a boundary part between the normal portion threshold value matrix and the correction portion threshold value matrix can be suppressed. In addition, according to the present embodiment, even in a case where a plurality of defective nozzles occur in a concentrated manner, high-quality correction can be performed without deterioration in granularity of the correction portion.

<<Jetting Method of Ink Jet Head>>

An ejector of an ink jet head is configured to include a nozzle that jets a liquid, a pressure chamber that communicates with the nozzle, and a jetting energy generation element that provides jetting energy to a liquid in the pressure chamber. Regarding a jetting method of jetting a liquid droplet from the nozzle of the ejector, means for generating the jetting energy is not limited to a piezoelectric element, and various jetting energy generation elements such as a heating element and an electrostatic actuator may be applied. For example, a method of jetting the liquid droplet using a pressure of film boiling caused by heating the liquid by the heating element can be employed. The jetting energy generation element corresponding to the jetting method of the ink jet head is disposed in a flow channel structure.

<<Recording Medium>>

The "paper" is an example of a recording medium used for forming the image. The term recording medium collectively refers to various terms called recording paper, printing paper, a printing medium, a typing medium, a printed medium, an image forming medium, an image-formed medium, an image receiving medium, a jetted medium, and the like. A material, a shape, and the like of the recording medium are not particularly limited, and various sheets such as seal paper, a resin sheet, a film, cloth, nonwoven fabric, and others can be used regardless of the material and the shape. The recording medium is not limited to a cut medium and may be a continuous medium such as continuous paper. In addition, the cut paper is not limited to cut paper trimmed in advance in a prescribed size and may be obtained at any time by cutting the continuous medium into a prescribed size.

<<Configuration of Relatively Moving Recording Head and Paper>>

While a configuration of transporting the paper with respect to the recording head stopped at a printing position is illustrated in the embodiment, a configuration of moving the recording head with respect to the paper P is also available in the embodiment of the present invention. In addition, while the line-type recording heads of the single pass method are normally arranged in the paper width direction orthogonal to a paper transport direction, an aspect of arranging the line-type recording heads in an oblique direction at a predetermined angle with respect to the paper width direction is also available.

<<Transport Means for Recording Medium>>

Means for transporting the paper is not limited to a drum transport method illustrated in FIG. 20. Various forms such as a belt transport method, a nip transport method, a chain transport method, and a pallet transport method can be employed, and these methods can be appropriately combined.

<<Modification Example of Recording Head>>

While the ink jet printing apparatus of the single pass method is described in the embodiment, an application scope of the present invention is not limited thereto. The present invention can also be applied to an image forming apparatus that performs image recording by performing head scanning a plurality of number of times while moving a short recording head such as a serial-type (shutter scan-type) head. In a case of forming a color image using a recording head of an ink jet method, heads may be arranged for each color of ink of a plurality of colors, or ink of a plurality of colors may be configured to be jettable from one recording head.

<<Image Forming Apparatus Using Recording Head of Other Than Ink Jet Method>>

While the ink jet printing apparatus is illustrated in the above description, the application scope of the present invention is not limited thereto. Besides the ink jet method, the present invention can also be applied to image forming apparatuses of various methods for performing dot recording, such as a thermal transfer recording apparatus comprising a recording head using a thermal element as a recording element, an LED electrophotographic printer comprising a recording head using a light emitting diode (LED) element as a recording element, and a gelatin silver photographic printer including an LED line exposure head. A medium lifting detection device according to the embodiment of the present invention can be applied to the image forming apparatuses of various printing methods other than the ink jet printing apparatus. For example, the present invention can also be applied to an image forming apparatus that obtains various shapes or patterns using a liquid functional material, such as a wiring line drawing apparatus that draws a wiring pattern of an electronic circuit, a manufacturing apparatus for various devices, a resist printing apparatus that uses a resin liquid as a functional liquid for jetting, a color filter manufacturing apparatus, and a microstructure forming apparatus that forms a microstructure using a material for material deposition.

Terms

The term "printing apparatus" is synonymous with a term such as a printing machine, a printer, a typing apparatus, an image recording apparatus, an image forming apparatus, an image output apparatus, or a drawing apparatus.

The term "recording head" is synonymous with a term such as a printing head, a typing head, a printhead, or a drawing head and includes a concept of an ink jet head, an ink jetting head, a liquid jetting head, a liquid droplet jetting head, or a liquid droplet ejection head.

The "image" is interpreted in a broad sense and includes a color image, a monochrome image, a single color image, a gradation image, a uniform density (solid) image, and the like. The "image" is not limited to a photographic image and is used as a collective term including a design, a text, a symbol, a line drawing, a mosaic pattern, a color-coding pattern, and other various patterns or an appropriate combination thereof.

In addition, the "image" is not limited to an image formed using ink containing a coloring material and may be an image formed using a treatment liquid applied to the paper before ink application, varnish applied to the paper after ink application, or the like.

The "formation" of the image includes concepts of terms such as recording, printing, typing, drawing, and a print of the image.

The term "orthogonal" or "perpendicular" in the present specification includes an aspect that generates the same action effect as in a case of intersection at a substantially 90° angle among aspects of intersection at an angle less than 90° or an angle exceeding 90°.

Combination of Embodiment, Modification Example, and Like

Configurations described in the embodiment and items described in the modification example can be appropriately combined. In addition, a part of the items may be replaced.

Configuration requirements of the embodiment of the present invention described above can be appropriately changed, added, or removed without departing from a gist of the present invention. The present invention is not limited to the embodiment described above, and various modifications can be made by those having normal knowledge in an equivalent or relevant field within a technical idea of the present invention.

EXPLANATION OF REFERENCES

10: image processing apparatus
12: image acquisition portion
20: masking processing portion
22: region selection processing portion
22A: density correction region selection processing portion
22B: threshold value matrix region selection processing portion
24: density correction processing portion
26: quantization processing portion
28: image output portion
32: defective nozzle detection processing portion
34: density correction LUT generation processing portion
40: defective nozzle information storage portion
42: density correction LUT storage portion
44: threshold value matrix storage portion
100: image processing apparatus
110: system control portion
112: nozzle jetting characteristic information acquisition portion
116: pixel value changing processing portion
118: memory
150: image forming apparatus
160: recording head
162: piezoelectric element
164: switch IC
168: paper transport portion
170: control device
172: paper transport control portion
174: image processing portion
176: driving waveform generation portion
178: head driver
201: ink jet printing apparatus
210: paper feeding portion
212: paper feeding device
212A: paper feeding stand
214: feeder board
216: paper feeding drum
220: treatment liquid application portion
222: treatment liquid coating drum
223: gripper
224: treatment liquid coating device
230: treatment liquid drying portion
232: treatment liquid drying drum
233: gripper
234: hot air blower
240: drawing portion
242: drawing drum
243: gripper
244: head unit
245: detection portion
246C, 246K, 246M, 246Y: ink jet head
246K1, 246K2, 246C1, 246C2: printhead
246M1, 246M2, 246Y1, 246Y2: printhead
247: paper pressing roller
248: image reading device 250: ink drying portion
260: stacking portion
262: stacking device
262A: stacking tray
270: chain gripper
271A: first sprocket
271B: second sprocket
272: chain
274: gripper
280: paper guide
282: first paper guide
284: second paper guide
290: heated drying processing portion
300: ink jet head
302: head module
304: base frame
306: flexible substrate
322: nozzle surface
326: nozzle
330: nozzle plate
332: pressure chamber
334: common flow channel
336: flow channel plate
338: supply port
340: vibration plate
342: individual electrode
344: lower electrode
346: piezoelectric body
348: piezoelectric element
350: control device
360: system controller
362: communication portion
364: display portion
366: input device
368: image recording control portion
370: CPU
372: read-only memory
374: random access memory
382: rotary encoder
BA: boundary portion
CA: correction portion
DA: defective portion
NM: normal portion threshold value matrix
BM: boundary portion threshold value matrix
CM: correction portion threshold value matrix
LCM: left correction portion threshold value matrix
LBM: left boundary portion threshold value matrix
RCM: right correction portion threshold value matrix
RBM: right boundary portion threshold value matrix
NMA: normal portion threshold value matrix application region
CMA: correction portion threshold value matrix application region
LCMA: left correction portion threshold value matrix application region
RCMA: right correction portion threshold value matrix application region
LBMA: left boundary portion threshold value matrix application region
RBMA: right boundary portion threshold value matrix application region
CP: correction portion original pattern
NP: normal portion original pattern
BOP: boundary portion optimization pattern
IM: image
IM1: image
IMipt: input image
IMout: output image
ACPRD: calibration pattern reading data
NCPRD: nozzle examination pattern reading data
P: paper
S12 to S28: step of image processing method
S31 to S38: step of region selection processing
S51 to S59: step of each pixel quantization processing

What is claimed is:

1. An image processing method comprising:
acquiring information indicating recording characteristics of recording elements in a recording head including a plurality of the recording elements;
performing correction of suppressing visibility of an image defect caused by a defective recording element using the recording elements around the defective recording element by performing masking processing of disabling the defective recording element in accordance with the recording characteristics of the recording elements; and
performing processing of quantization of data of an image by applying a threshold value matrix selected from a first threshold value matrix, a second threshold value matrix, and a third threshold value matrix in accordance with a position of the image,
wherein the processing of the quantization includes
applying the first threshold value matrix to a first image region that is separated by more than a first distance from a defective image region of the image corresponding to the defective recording element,
applying the second threshold value matrix to a second image region that is a region around the defective image region and is separated by less than the first distance from the defective image region, and
applying the third threshold value matrix to a third image region that is positioned at a boundary between the first image region and the second image region.

2. The image processing method according to claim 1, further comprising:
in a case where a plurality of the defective recording elements are present, and a distance between the defective recording elements is less than a second distance, performing the quantization of a pixel between the nearby defective recording elements using the second threshold value matrix.

3. The image processing method according to claim 1, wherein the second threshold value matrix has frequency characteristics in which the quantization is performed such that a peak frequency component of the quantization is positioned in a frequency band excluding a frequency band near a spatial frequency peak of the second image region.

4. The image processing method according to claim 1, wherein the second threshold value matrix has frequency characteristics in which a spatial frequency component in a first direction parallel to a relative movement direction of a recording medium with respect to the recording head is suppressed for all spatial frequency components in a second direction orthogonal to the first direction.

5. The image processing method according to claim 1, wherein the second threshold value matrix is generated by referring to a common pattern of at least one of a first pattern generated from the first threshold value matrix or a second pattern used in a case of generating the first threshold value matrix.

6. The image processing method according to claim 1,
wherein the third threshold value matrix is generated using a first threshold value matrix pattern that is dot arrangement implemented by the first threshold value matrix, and a second threshold value matrix pattern that is dot arrangement implemented by the second threshold value matrix, such that a low frequency component of a pattern in which the first threshold value matrix pattern and the second threshold value matrix pattern are combined is suppressed.

7. The image processing method according to any claim 1,
wherein a plurality of types of threshold value matrices are used as the third threshold value matrix, and
the plurality of types of the third threshold value matrices are selectively applied in accordance with a position relationship between the first threshold value matrix and the second threshold value matrix.

8. The image processing method according to claim 7,
wherein the plurality of types of third threshold value matrices are generated by optimizing patterns of a plurality of boundary parts at the same time in the plurality of boundary parts generated by combining a first threshold value matrix pattern that is dot arrangement implemented by the first threshold value matrix, and a second threshold value matrix pattern that is dot arrangement implemented by the second threshold value matrix.

9. The image processing method according to claim 1,
wherein the third threshold value matrix is generated by sequentially changing a boundary position at which a first threshold value matrix pattern that is dot arrangement implemented by the first threshold value matrix, and a second threshold value matrix pattern that is dot arrangement implemented by the second threshold value matrix are combined, and is generated by combining patterns of the plurality of boundary positions.

10. The image processing method according to claim 1,
wherein the processing of the quantization includes, in a case where the defective recording element is present in the recording head, offsetting a phase of a reference position in a case of referring to the threshold value matrix selected from the first threshold value matrix, the second threshold value matrix, and the third threshold value matrix, in accordance with an address of the image representing the position of the image.

11. A non-temporary computer-readable recording medium causing a computer to execute the image processing method according to claim 1 in a case where an instruction stored in the recording medium is read out by the computer.

12. An image processing apparatus comprising:
a recording element information acquisition portion that acquires information indicating recording characteristics of recording elements in a recording head including a plurality of the recording elements;
a correction processing portion that performs correction of suppressing visibility of an image defect caused by a defective recording element using the recording elements around the defective recording element by performing masking processing of disabling the defective recording element in accordance with the recording characteristics of the recording elements; and
a quantization processing portion that performs processing of quantization of data of an image by applying a threshold value matrix selected from a first threshold value matrix, a second threshold value matrix, and a third threshold value matrix in accordance with a position of the image,
wherein the quantization processing portion
applies the first threshold value matrix to a first image region that is separated by more than a first distance from a defective image region of the image corresponding to the defective recording element,
applies the second threshold value matrix to a second image region that is a region around the defective image region and is separated by less than the first distance from the defective image region, and
applies the third threshold value matrix to a third image region that is positioned at a boundary between the first image region and the second image region.

13. The image processing apparatus according to claim 12, further comprising:
a threshold value matrix storage portion that stores the first threshold value matrix, the second threshold value matrix, and the third threshold value matrix; and
a region selection processing portion that selects the first threshold value matrix, the second threshold value matrix, and the third threshold value matrix to be referred to in the processing of the quantization in accordance with defective recording element information including position information of the defective recording element and the position of the image.

14. The image processing apparatus according to claim 13, further comprising:
a density correction processing portion that performs density correction processing of correcting a pixel value of the image position corresponding to each recording element using a density correction table corresponding to the recording characteristics of each of the plurality of recording elements,
wherein the region selection processing portion switches the density correction table to be applied to the density correction processing in connection with selection of the threshold value matrix.

15. The image processing apparatus according to claim 12, further comprising:
a defective recording element detection processing portion that performs processing of detecting the defective recording element of the recording head; and
a density correction table generation processing portion that performs processing of generating a density correction table corresponding to the recording characteristics of each of the plurality of recording elements.

16. The image processing apparatus according to claim 12,
wherein the recording head is an ink jet head, and
the recording elements are nozzles jetting ink.

17. An image forming apparatus comprising:
the image processing apparatus according to claim 12; and
a recording head that records an image on a recording medium using image data quantized using the image processing apparatus.

* * * * *